(12) United States Patent
Saitou

(10) Patent No.: US 10,371,027 B2
(45) Date of Patent: Aug. 6, 2019

(54) EXHAUST GAS PURIFICATION SYSTEM OF WORKING MACHINE

(75) Inventor: Kenta Saitou, Osaka (JP)

(73) Assignee: YANMAR CO., LTD., Osaka (JP)

(*) Notice: Subject to any disclaimer, the term of this patent is extended or adjusted under 35 U.S.C. 154(b) by 2028 days.

(21) Appl. No.: 13/643,664

(22) PCT Filed: Apr. 25, 2011

(86) PCT No.: PCT/JP2011/060078
§ 371 (c)(1),
(2), (4) Date: Nov. 9, 2012

(87) PCT Pub. No.: WO2011/136184
PCT Pub. Date: Nov. 3, 2011

(65) Prior Publication Data
US 2019/0010843 A1 Jan. 10, 2019

(30) Foreign Application Priority Data

Apr. 30, 2010 (JP) .................................. 2010-105088
Apr. 30, 2010 (JP) .................................. 2010-105089
Apr. 30, 2010 (JP) .................................. 2010-105090

(51) Int. Cl.
*F01N 3/023* (2006.01)
*F01N 3/025* (2006.01)
(Continued)

(52) U.S. Cl.
CPC ......... *F01N 3/0235* (2013.01); *F01N 3/0253* (2013.01); *F01N 3/035* (2013.01);
(Continued)

(58) Field of Classification Search
CPC ....... F01N 3/0235; F01N 3/0253; F01N 9/002
See application file for complete search history.

(56) References Cited

U.S. PATENT DOCUMENTS 4,884,398 A * 12/1989 Morita .................. F01N 3/0222
60/274
2004/0244366 A1 12/2004 Hiranuma et al.
(Continued)

FOREIGN PATENT DOCUMENTS

EP 1 582 708 A2 10/2005
EP 1 582 721 A2 10/2005
(Continued)

*Primary Examiner* — Audrey K Bradley
(74) *Attorney, Agent, or Firm* — Norton Rose Fulbright US LLP

(57) ABSTRACT

An exhaust gas purification system of a working machine is operable to reduce a loss of a working time caused by a point that it takes a long time to renew an exhaust gas purification device by throttle devices. The exhaust gas purification system of the working machine is provided with a common rail type engine which is mounted to the working machine, an exhaust gas purification device which is arranged in an exhaust system of the engine, and at least one of the intake air throttle device and the exhaust gas throttle device. It is provided with mode selection input means which selects whether an auxiliary renewing mode is executed or a forced renewing mode is executed in the case that a clogged state of the exhaust gas purification device is equal to or more than a prescribed level.

17 Claims, 13 Drawing Sheets

(51) Int. Cl.
  *F01N 3/033* (2006.01)
  *F01N 3/035* (2006.01)
  *F01N 9/00* (2006.01)
  *F02D 41/02* (2006.01)
  *F02D 41/40* (2006.01)
  *F02D 41/14* (2006.01)
  *F01N 13/00* (2010.01)
  *F02D 41/00* (2006.01)

(52) U.S. Cl.
  CPC ........... *F01N 3/0335* (2013.01); *F01N 9/002* (2013.01); *F01N 13/0097* (2014.06); *F02D 41/021* (2013.01); *F02D 41/025* (2013.01); *F02D 41/029* (2013.01); *F02D 41/1448* (2013.01); *F01N 2550/04* (2013.01); *F01N 2900/1602* (2013.01); *F02D 41/0002* (2013.01); *F02D 41/405* (2013.01); *F02D 2200/0802* (2013.01); *F02D 2200/0812* (2013.01); *Y02T 10/26* (2013.01); *Y02T 10/47* (2013.01)

(56) References Cited

U.S. PATENT DOCUMENTS

| 2005/0072141 A1 | 4/2005 | Kitahara |
| 2009/0183495 A1* | 7/2009 | Onodera ............... F01N 3/0231 60/286 |
| 2009/0235644 A1* | 9/2009 | Wu ................... B01D 53/9495 60/285 |
| 2010/0089035 A1 | 4/2010 | Kamiya et al. |
| 2010/0095656 A1 | 4/2010 | Kamiya et al. |
| 2010/0170227 A1* | 7/2010 | Tsukada .................... E02F 9/00 60/286 |

FOREIGN PATENT DOCUMENTS

| JP | 5-187221 A | 7/1993 |
| JP | 2000-145430 | 5/2000 |
| JP | 2003-003829 | 1/2003 |
| JP | 2003-027922 | 1/2003 |
| JP | 2003003829 A | * 1/2003 |
| JP | 2003-083029 A | 3/2003 |
| JP | 2003-184538 A | 7/2003 |
| JP | 2004-176596 | 6/2004 |
| JP | 2005-139944 | 6/2005 |
| JP | 2007-239522 A | 9/2007 |
| JP | 2009-079501 | 4/2009 |
| JP | 2009-257220 A | 11/2009 |
| JP | 2009-257323 A | 11/2009 |
| JP | 2010-019187 | 1/2010 |
| JP | 2010-077937 A | 4/2010 |
| JP | 2010-077954 | 4/2010 |
| JP | 2010-127253 | 6/2010 |
| WO | WO-2009060719 A1 * | 5/2009 ................ E02F 9/00 |

* cited by examiner

EXHAUST GAS PURIFICATION SYSTEM OF WORKING MACHINE

BACKGROUND OF THE INVENTION

The present invention relates to an exhaust gas purification system of a working machine, for example, a construction machine, an agricultural machine and an engine generator.

In recent years, as an application of an emission control of a high order with regard to a diesel engine (hereinafter, refer simply to as an engine), it is going to be desired to mount an exhaust gas purification device which purifies an air pollutant in an exhaust gas, to a construction machine, an agricultural machine and an engine generator to which the engine is mounted. As the exhaust gas purification device, a diesel particulate filter (hereinafter, refer to as DPF) has been known (refer to Patent Documents 1 and 2). The DPF is provided for collecting a particulate matter (hereinafter, refer to as PM) or the like. In this case, if the PM which is collected by the DPF exceeds a prescribed amount, a distribution resistance within the DPF is increased and thereby causing a reduction of an engine output. Accordingly, it is also frequently carried out to remove the PM which is deposited in the DPF on the basis of a temperature rise of the exhaust gas so as to bring back a PM collecting capacity of the DPF (renew the DPF).

CITATION LIST

Patent Literature

Patent Document Japanese Patent Application Laid-open No. 2000-145430

Patent Document Japanese Patent Application Laid-open No. 2003-27922

SUMMARY OF THE INVENTION

In the case of renewing the DPF in the conventional structure, an engine load is increased by closing an intake air throttle device or an exhaust gas throttle device to a predetermined opening degree so as to limit an amount of intake air or exhaust gas, and an engine output (a rotating speed and a torque) is enlarged by increasing a fuel consumption rate to exceed an operation amount of an accelerator operating device such as a throttle lever or an accelerator petal, only at the increased engine load. As a result, a temperature of the exhaust gas from the engine is raised (a thermal energy is applied to the exhaust gas).

However, since a shock and a change of an engine sound due to a fluctuation of an engine output are generated in the case of renewing the DPF, there has been a problem that an uncomfortable feeling is applied to an operator. Further, it is impossible to deny a possibility that the operator erroneously recognizes a sudden shock and the change of the engine sound as an abnormality. In addition, in the DPF renewal by using the intake air throttle device and the exhaust gas throttle device, since it takes comparatively a long time (for example, about 30 minutes) to execute the renewal, it is not preferable in the light of a workability that the change of the engine output and the engine sound is generated at a high frequency for a long time, in the construction machine which frequently perform a careful work on the basis of the engine sound.

On the other hand, the longer a piping length of an exhaust system from the engine to the DPF is, the more the temperature of the exhaust gas until reaching the DPF is lowered. Therefore, it is preferable to arrange the DPF at a position which is as closer to the engine as possible. However, in a working machine, such as a fork lift and a backhoe, it is necessary to make a machine body itself compact because it is desired to make a turning radius as small as possible for preventing a contact with a periphery. Therefore, a mounting space for the engine and the DPF is often constrained (narrow). Accordingly, the DPF has sometimes no other choice of being placed at a position which is away from the engine, and it is necessary to maintain a purifying function and a renewing function of the DPF even in this case.

Accordingly, it is a technical object of the present invention to provide an exhaust gas purification system of a working machine to which an improvement is applied by making a study of the actual condition mentioned above.

According to a first aspect of the invention, there is provided an exhaust gas purification system of a working machine, the exhaust gas purification system including a common rail type engine which is mounted to a working machine, an exhaust gas purification device which is arranged in an exhaust system of the engine, and at least one of an intake air throttle device and an exhaust gas throttle device which are arranged in intake and exhaust systems of the engine, wherein the exhaust gas purification system is structured so as to execute an auxiliary renewing mode which raises a temperature of an exhaust gas from the engine by actuating the at least one throttle device, and a forced renewing mode which supplies a fuel into the exhaust gas purification device on the basis of a post injection, and the exhaust gas purification system includes mode selection input means which selects whether the auxiliary renewing mode is executed or the forced renewing mode is executed in the case that a clogged state of the exhaust gas purification device is equal to or more than a prescribed level.

According to a second aspect of the invention, there is provided the exhaust gas purification system of the working machine as recited in the first aspect, wherein the exhaust gas purification system is structured such that in the case that the clogged state of the exhaust gas purification device is not improved even by executing the auxiliary renewing mode, the forced renewing mode is executed regardless of a selection state of the mode selection input means.

According to a third aspect of the invention, there is provided the exhaust gas purification system of the working machine as recited in the second aspect, further including forced renewal advance notifying means which is actuated before the forced renewing mode is executed.

According to a fourth aspect of the invention, there is provided the exhaust gas purification system of the working machine as recited in the first aspect, wherein the exhaust gas purification system is structured such that the auxiliary renewing mode is not executed regardless of the clogged state of the exhaust gas purification device, during an operation of the operating means with respect to a working portion which is provided in the working machine.

According to a fifth aspect of the invention, there is provided the exhaust gas purification system of the working machine as recited in the fourth aspect, further including renewal inhibition informing means which is actuated in the case that the auxiliary renewing mode is not executed under a condition that the clogged state of the exhaust gas purification device is equal to or more than the prescribed level.

According to a sixth aspect of the invention, there is provided the exhaust gas purification system of the working machine as recited in the fourth or fifth aspect, wherein the exhaust gas purification system is structured such that an execution inhibition of the auxiliary renewing mode is released in the ease that a predetermined time elapses in a non-operation state after an end of the operation of the operating means, under a condition that the clogged state of the exhaust gas purification device is equal to or more than the prescribed level.

According to a seventh aspect of the invention, there is provided the exhaust gas purification system of the working machine as recited in the first aspect, wherein the exhaust gas purification system is structured such that the auxiliary renewing mode is executed regardless of the clogged state of the exhaust gas purification device, in the case that the temperature of the exhaust gas within the exhaust gas purification device is equal to or less than a previously set prescribed temperature.

According to an eighth aspect of the invention, there is provided the exhaust gas purification system of the working machine as recited in the seventh aspect, wherein the exhaust gas purification system is structured so as to come back to a normal operation mode after a predetermined time elapses, in the case that the auxiliary renewing mode is executed on the basis of the temperature of the exhaust gas within the exhaust gas purification device.

According to a ninth aspect of the invention, there is provided the exhaust gas purification system of the working machine as recited in the eighth aspect, wherein an executing time of the auxiliary renewing mode on the basis of the temperature of the exhaust gas within the exhaust gas purification device is set shorter than an executing time of the auxiliary renewing mode on the basis of the clogged state of the exhaust gas purification device.

According to the invention of the first aspect, since the exhaust gas purification system includes the common rail type engine which is mounted to the working machine, the exhaust gas purification device which is arranged in the exhaust system of the engine, and at least one of the intake air throttle device and the exhaust gas throttle device which are arranged in the intake and exhaust systems of the engine, the exhaust gas purification system is structured so as to execute the auxiliary renewing mode which raises the temperature of the exhaust gas from the engine by actuating the at least one throttle device, and the forced renewing mode which supplies the fuel into the exhaust gas purification device on the basis of the post injection, and the exhaust gas purification system includes the mode selection input means which selects whether the auxiliary renewing mode is executed or the forced renewing mode is executed in the case that the clogged state of the exhaust gas purification device is equal to or more than the prescribed level, the operator can select a control mode (a control type relating to the renewal of the exhaust gas purification device) of the engine depending on a working state, on the basis of the operation of the mode selection input means. Accordingly, it is possible to restrict a loss of a working time caused by a point that it takes a long time to renew the exhaust gas purification device by the throttle device, and there can be achieved an effect that an improvement of a working efficiency can be achieved.

According to the invention of the second aspect, since the exhaust gas purification system is structured such that in the case that the clogged state of the exhaust gas purification device is not improved even by executing the auxiliary renewing mode, the forced renewing mode is executed regardless of the selection state of the mode selection input means, it is possible to smoothly change from the auxiliary renewing mode to the forced renewing mode which can forcibly and efficiently burn and remove a particulate matter within the exhaust gas purification device, without any re-operation of the mode selection input means by the operator so as to reselect the forced renewing mode. Therefore, it is possible to securely burn and remove the particulate matter within the exhaust gas purification device, depending on a condition that the clogged state of the exhaust gas purification device is not improved, while omitting a labor hour for operating the mode selection input means, and there can be achieved an effect that it is possible to prevent a malfunction of the exhaust gas purification device and the engine caused by the clogging of the particulate matter.

According to the invention of the third aspect, since the exhaust gas purification device is provided with the forced renewal advance notifying means which is actuated before the forced renewing mode is executed, the operator can previously comprehend a fact that the mode changes to the forced renewing mode, on the basis of the actuation of the forced renewal advance notifying means, in the case that the clogged state of the exhaust gas purification device is not improved and the mode changes to the forced renewing mode, and can assume previously the shock of the output fluctuation and the change of the engine sound which are generated thereafter. Therefore, there can be achieved an effect that it is possible to do away with an uncomfortable feeling of the operator which is caused by the renewing motion of the exhaust gas purification device.

According to the invention of the fourth aspect, since the exhaust gas purification system is structured such that the auxiliary renewing mode is not executed regardless of the clogged state of the exhaust gas purification device, during the operation of the operating means with respect to the working portion which is provided in the working machine, it is possible to inhibit the renewing motion of the exhaust gas purification device by actuating the operating means with respect to the working portion. In other words, it is possible to inhibit the renewing motion of the exhaust gas purification device, on the basis of an intention of the operator depending on the working state of the working machine or the like. Accordingly, the operator can smoothly carry out the careful work which is executed on the basis of the engine sound, while it is possible to execute the renewing control of recovering a particulate matter collecting capacity of the exhaust gas purification device. In other words, there can be achieved an effect that it is possible to do away with a defect of the renewing motion of the exhaust gas purification device which may obstruct the careful work.

According to the invention of the fifth aspect, since the exhaust gas purification device is provided with the renewal inhibition informing means which is actuated in the case that the auxiliary renewing mode is not executed under the condition that the clogged state of the exhaust gas purification device is equal to or more than the prescribed level, it is possible to visually appeal to the operator the fact that the renewing motion of the exhaust gas purification device is inhibited, by the information of the renewal inhibition informing means, while the operating means is operated with respect to the working portion, and it is possible to securely call the operator's attention. It possible to easily confirm whether or not the renewal is under inhibition, by checking the state of the renewal inhibition informing means.

According to the invention of the sixth aspect, since the exhaust gas purification system is structured such that the execution inhibition of the auxiliary renewing mode is released in the case that the predetermined time elapses in the non-operation state after the end of the operation of the operating means, under the condition that the clogged state of the exhaust gas purification device is equal to or more than the prescribed level, the renewing motion of the exhaust gas purification device is not executed as soon as the operation of the operating means is finished (the renewing motion of the exhaust gas purification device is executed after a certain degree of delay time elapses). Accordingly, there can be achieved an effect that it is possible to smoothly change to the renewing motion of the exhaust gas purification device by reducing the uncomfortable feeling applied to the operator as much as possible.

According to the invention of the seventh aspect, since the exhaust gas purification system is structured such that the auxiliary renewing mode is executed regardless of the clogged state of the exhaust gas purification device, in the case that the temperature of the exhaust gas within the exhaust gas purification device is equal to or less than the previously set prescribed temperature, it is possible to positively raise the temperature of the exhaust gas even under a condition that the temperature of the exhaust gas tends to be lowered, such as the case that the exhaust gas purification device is arranged away from the engine, so that it is possible to reduce and delay a deposition of the particulate matter within the exhaust gas purification device. Even in the case that the exhaust gas purification device is arranged away from the engine, it is possible to maintain the purifying function and the renewing function of the exhaust gas purification device over a long time period.

According to the invention of the eighth aspect, since the exhaust gas purification system is structured so as to come back to the normal operation mode after the predetermined time elapses, in the case that the auxiliary renewing mode is executed on the basis of the temperature of the exhaust gas within the exhaust gas purification device, it is not necessary for the operator to carry out a returning operation, for example, for returning to the normal operation mode. Therefore, there can be achieved an effect that a labor hour for the operation can be omitted and it is possible to reduce an operation load of the operator.

According to the invention of the ninth aspect, since the executing time of the auxiliary renewing mode on the basis of the temperature of the exhaust gas within the exhaust gas purification device is set shorter than the executing time of the auxiliary renewing mode on the basis of the clogged state of the exhaust gas purification device, it is possible to suppress the loss of the working time due to the temperature rise of the exhaust gas using the throttle device as much as possible. As a result, there can be achieved an effect that it can be a help of an improvement of the working efficiency.

DESCRIPTION OF THE PREFERRED EMBODIMENTS

A description will be given below of an embodiment which embodies the present invention on the basis of the accompanying drawings.

(1) Outline Structure of Fork Lift Car

Figure 1:
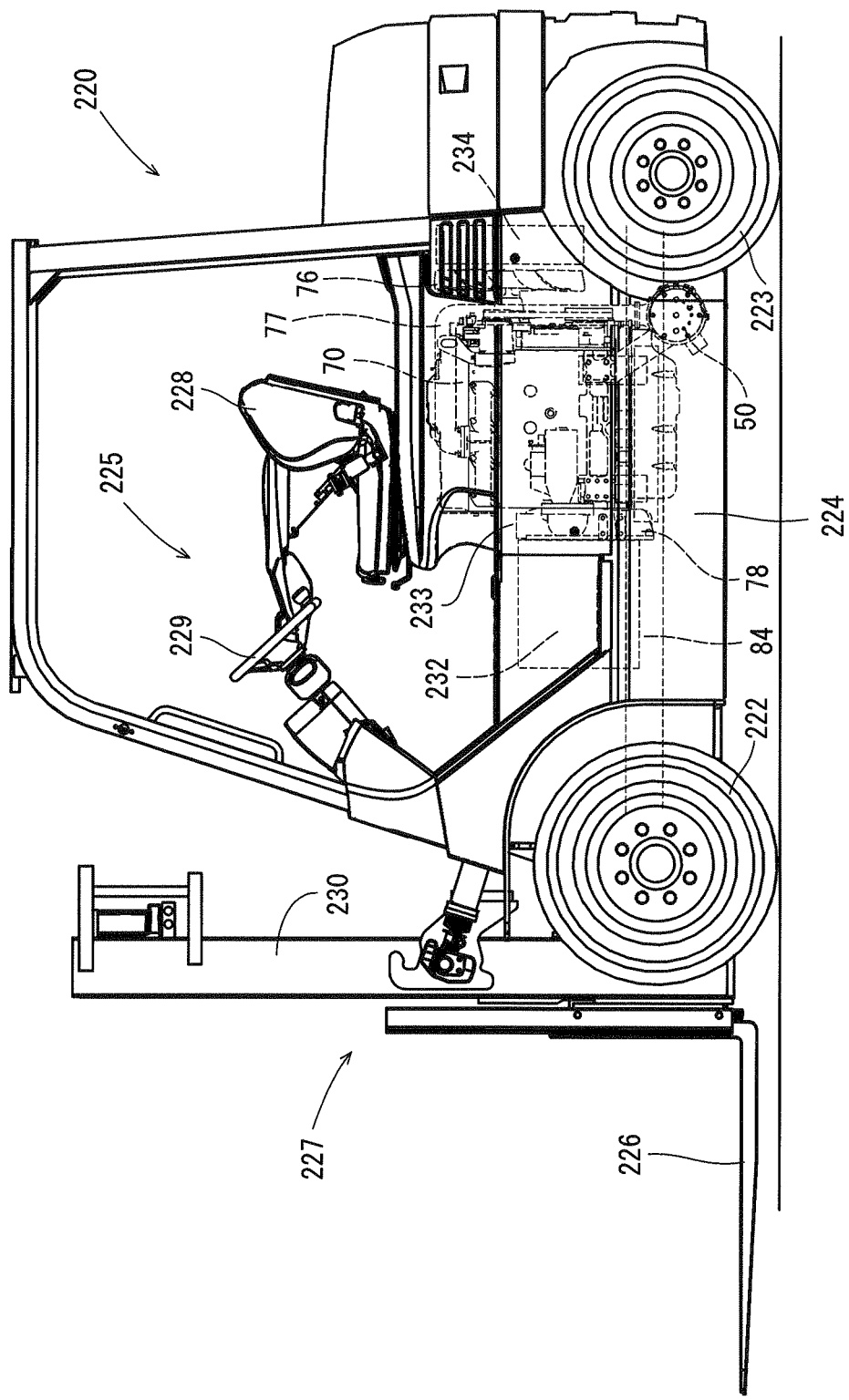
FIG. 1 is a side elevational view of a fork lift car to which an engine is mounted.
Figure 2:
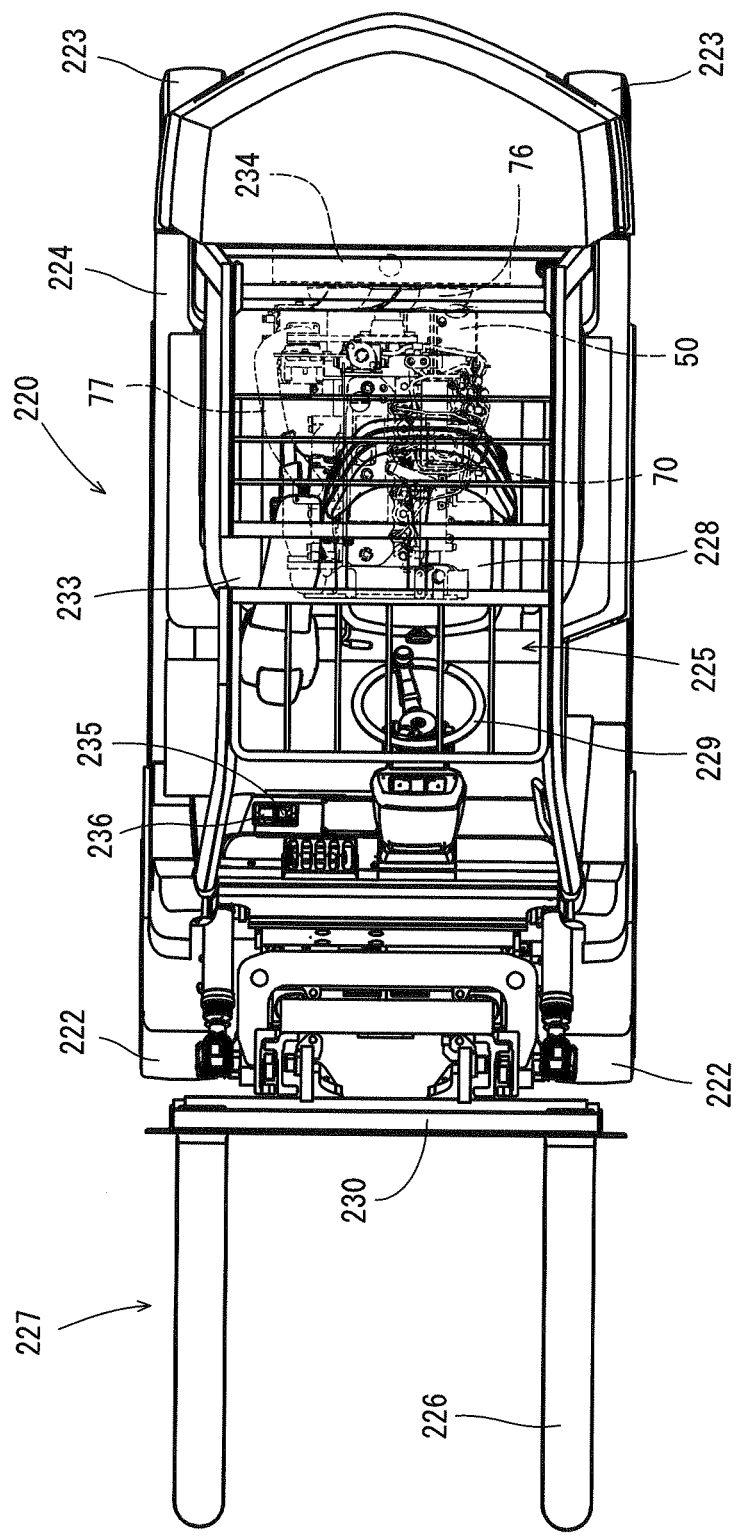
FIG. 2 is a plan view of the fork lift car.

First of all, a description will be given of an outline structure of a fork lift car 220 which corresponds to one example of a working machine to which an engine 70 is mounted, with reference to FIG. 1 and FIG. 2. As shown in FIG. 1 and FIG. 2, the fork lift car 220 is provided with a traveling machine body 224 which has a pair of right and left front wheels 222 and rear wheels 223. A control portion 225 and the engine 70 are mounted to the traveling machine body 224. The engine 70 is a diesel engine of a four-cylinder type. The engine 70 is covered with a cover body 233 from above, and the control portion 225 is provided oar the cover body 233.

A front portion side of the traveling machine body 224 is provided with a working portion 227 which has a fork 226 for a loading work. A rear portion side of the traveling machine body 224 is provided with a counter weight 231 for keeping a weight balance with the working portion 227. In the control portion 225, there are arranged a control seat 228 on which an operator seats, a control wheel 229, and a fork elevating lever 235 and a tilt lever 236 which correspond to operating means for the working portion 227. The fork 226 is installed to a mast 230 which corresponds to a constructing element of the working portion 227 so as to be movable up and down. A pallet (not shown) loading thereon is mounted to the fork 226 by operating the fork elevating lever 235 so as to move the fork 226 up and down, and a cargo handling work such as a carriage of the pallet is executed by moving the traveling machine body 224 forward and backward. The tilt lever 236 is structured so as to change and operate a vertical tilting angle of the fork 226 by tilting the mast 236.

A flywheel housing 78 of the engine 70 is positioned in a side of a front portion of the traveling machine body 224, and a cooling fan 76 is positioned in a side of a rear portion of the traveling machine body 224. In other words, the engine 70 is arranged in such a manner that a direction of a crank shaft in the engine 70 is along an arranging direction (a longitudinal direction) of the working portion 227 and a counter weight 231. The engine 70 is supported in a vibration absorbing manner to an engine attaching chassis 84 of the traveling machine body 224 via an engine leg body 83. A transmission case 232 is coupled to a side of a front face of the flywheel housing 78. A rotational power from the engine 70 via the flywheel 79 is appropriately shifted by the transmission case 232, and is transmitted to a hydraulic drive source of the front and rear wheels 222 and 223 and the fork 226.

A radiator 234 for cooling the engine is arranged at a high position which is closer to the counter weight 231, between the control seat 228 and the counter weight 231 which is arranged posterior to the control seat 228 within the cover body 233, in such a manner that the radiator 234 is opposed to the cooling fan 76. The radiator 234 is air cooled by spraying a cooling wind to the radiator 234 on the basis of a rotational drive of the cooling fan 76. As shown in FIG. 1, since the radiator 234 is arranged at the high position which is closer to the counter weight 231, a space is formed below the radiator 234 and the cooling fan 76. A diesel particulate filter 50 (hereinafter, refer to as DPF) which is an example of an exhaust gas purification device is accommodated in the space, in such a manner as to be opposed to an oil pan 81 which is arranged in a side of a lower face of the engine 70.

(2) Engine and Peripheral Structure of the Same

Next, a description will be given of the engine 70 which is mounted to the working machine (the fork lift car 220) and a peripheral structure of the same, with reference to FIG. 3 and FIG. 4. As shown in FIG. 4, the engine 70 of the embodiment is provided with a cylinder block 75 in which a cylinder head 72 is fastened to an upper face. An intake manifold 73 is connected to one side face of the cylinder head 72, and an exhaust manifold 71 is connected to the other side face. A common rail system 117 which supplies a fuel to each of cylinders of the engine 70 is provided below the intake manifold 73 in a side face of the cylinder block 75. An intake air throttle device 81 for regulating an intake air pressure (an amount of intake air) of the engine 70 and an air cleaner (not shown) are connected to an intake pipe 76 which is connected to an air intake upstream side of the intake manifold 73.

Figure 3:
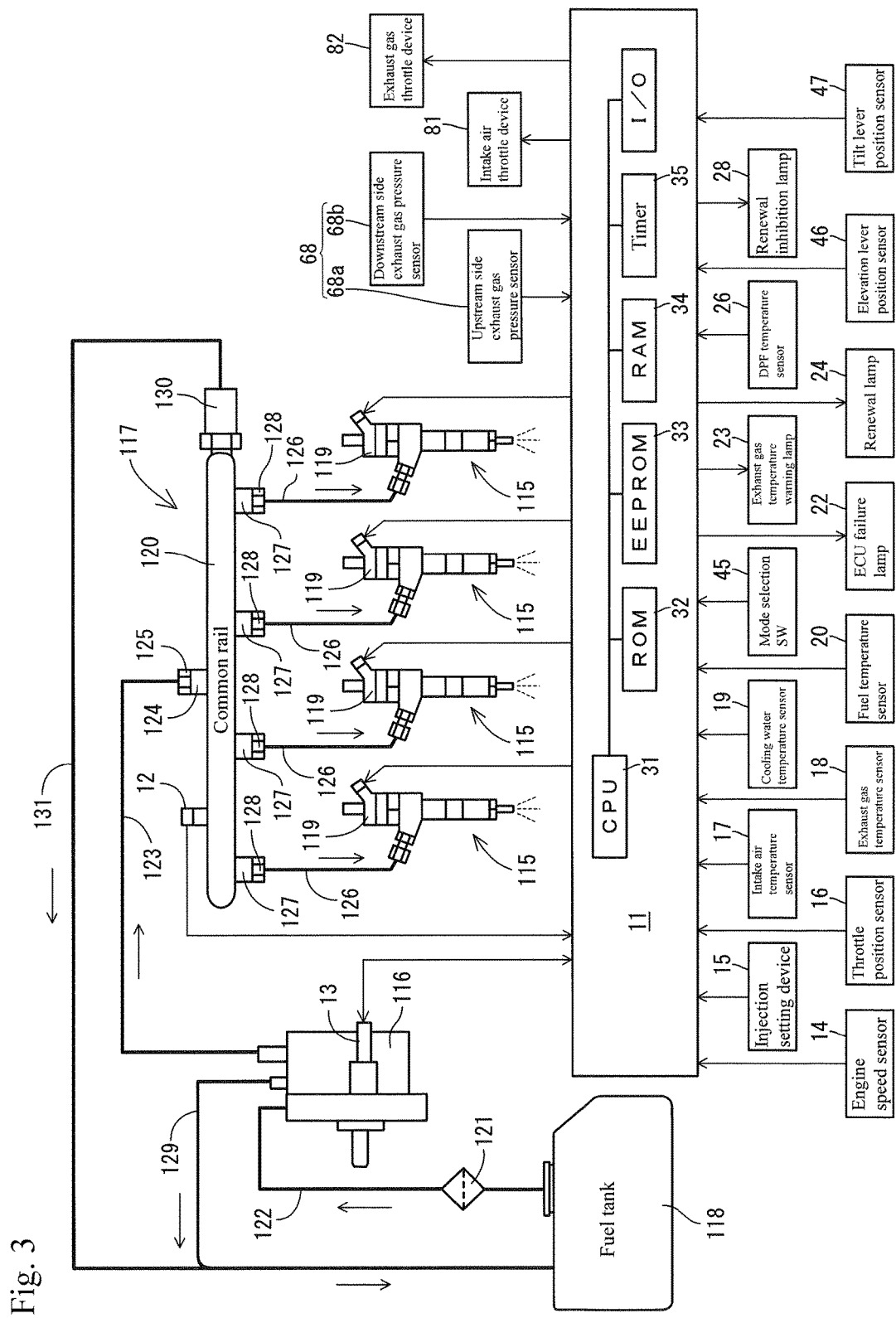
FIG. 3 is an explanatory view of a fuel system of the engine.
Figure 4:
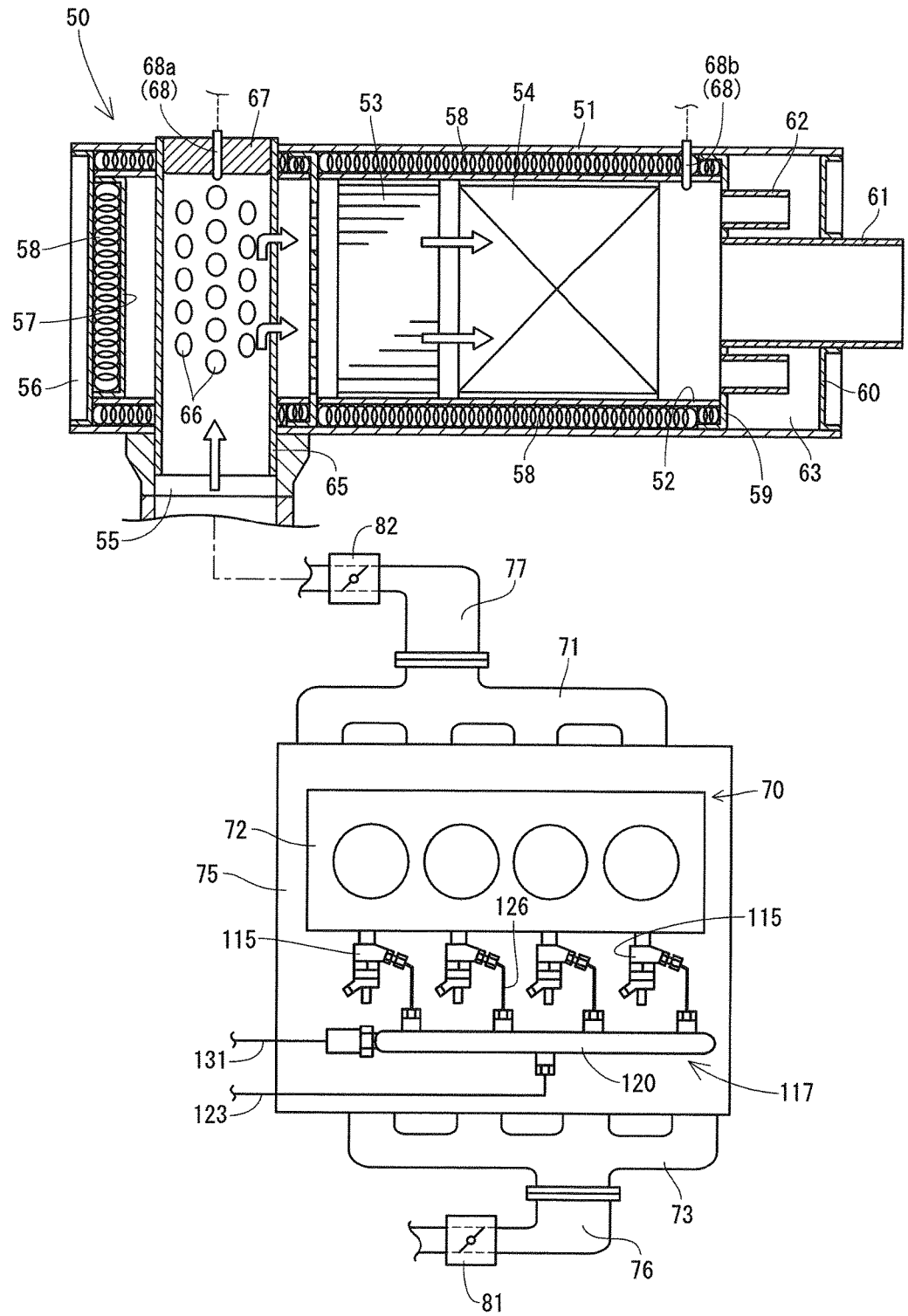
FIG. 4 is a function block diagram showing a relationship between the engine and an exhaust gas purification device.

As shown in FIG. 3, a fuel tank 118 is connected to each of injectors 115 for four cylinders in the engine 70 via a common rail system 117 and a fuel supply pump 116. Each of the injectors 115 is provided with a fuel injection valve 119 of an electromagnetically opening and closing control type. The common rail system 117 is provided with a cylindrical common rail 120. The fuel tank 118 is connected to an air intake side of the fuel supply pump 116 via a fuel filter 121 and a low pressure pipe 122. A fuel within the fuel tank 118 is sucked into the fuel supply pump 116 via the fuel filter 121 and the low pressure pipe 122. The fuel supply pump 116 of the embodiment is arranged in the vicinity of the intake manifold 73. On the other hand, the common rail 120 is connected to an air discharge side of the fuel supply pump 116 via a high pressure pipe 123. The injectors 115 for four cylinders are connected to the common rail 120 via four fuel injection pipes 126.

In the structure mentioned above, the fuel in the fuel tank 118 is pressure fed to the common rail 120 by the fuel supply pump 116, and the fuel having the high pressure is stored in the common rail 120. Each of the fuel injection valves 119 is controlled to be opened and closed, whereby the fuel having the high pressure within the common rail 120 is injected to each of the cylinders of the engine 70 from each of the injectors 115. In other words, an injection pressure, an injection timing, and an injection period (an injection amount) of the fuel which is supplied from each of the injectors 115 are controlled with a high precision. Accordingly, it is possible to reduce a nitrogen oxide (NOx) from the engine 70, and it is possible to reduce a noise vibration of the engine 70.

Figure 5:
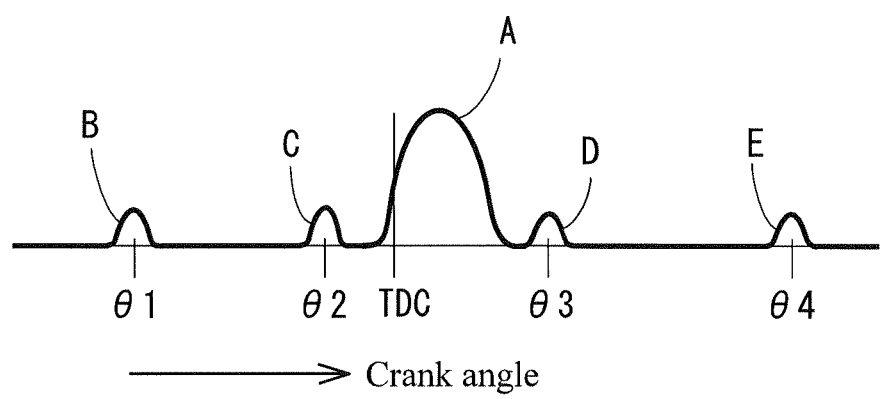
FIG. 5 is a view describing an injection timing of a fuel.

As shown in FIG. 5, the common rail system 117 is structured such as to execute a main injection A in the vicinity of a top dead center (TDC). Further, the common rail system 117 is structured such as to execute a small amount of pilot injection B for reducing the NOx and the noise at a moment of a crank angle θ1 which is about 60 degree before the top dead center, execute a pre injection C for reducing the noise at a moment of a crank angle θ2 which is just before the top dead center, and execute an after injection D and a post injection E for reducing a particulate matter (hereinafter, refer to as PM) and promoting a purification of the exhaust gas at a moment of crank angles θ3 and θ4 which are after the top dead center, in addition to the main injection A.

In this case, as shown in FIG. 3, the fuel supply pump 116 is connected to the fuel tank 118 via a fuel return pipe 129. A common rail return pipe 131 is connected to an end portion in a longitudinal direction of the cylindrical common rail 120 via a return pipe connector 130 which controls a pressure of the fuel within the common rail 120. In other words, a surplus fuel in the fuel supply pump 116 and a surplus fuel in the common rail 120 are recovered in the fuel tank 118 via the fuel return pipe 129 and the common rail return pipe 131.

To an exhaust pipe 77 which is connected to a downstream side of an exhaust gas in the exhaust manifold 71, there are connected an exhaust gas throttle device 82 for regulating an exhaust gas pressure of the engine 70, and a DPF 50 which corresponds to one example of the exhaust gas purification device. The exhaust gas discharged from each of the cylinders to the exhaust manifold 71 is discharged to an outside after being applied a purifying process via the exhaust pipe 77, the exhaust gas throttle device 82 and the DPF 50.

The DPF 50 is provided for collecting the PM or the like in the exhaust gas. The DPF 50 of the embodiment is structured such that a diesel oxidation catalyst 53, for example, a platinum or the like, and a soot filter 54 are arranged in series and accommodated in an approximately tubular filter case 52 within a casing 51 which is made of a heat resisting metal material. In the embodiment, the diesel oxidation catalyst 53 is arranged in an upstream side of the exhaust gas within the filter case 52, and the soot filter 54 is arranged in a downstream side of the exhaust gas. The soot filter 54 is formed as a honeycomb structure having a lot of cells which are sectioned by a porous (filterable) partition wall.

One side portion of the casing 51 is provided with an exhaust gas introduction port 55 which is communicated with the downstream side of the exhaust gas from the exhaust gas throttle device 82 among the exhaust pipe 77. One end portion of the casing 51 is occluded by a first bottom plate 56, and one end portion facing to the first bottom plate 56 among the filter case 52 is occluded by a second bottom plate 57. A heat insulating material 58 such as a glass wool is filled in an annular gap between the casing 51 and the filter case 52, and a gap between both the bottom plates 56 and 57, in such a manner as to surround a periphery of the diesel oxidation catalyst 53 and the soot filter 54. The other side portion of the casing 51 is occluded by two lid plates 59 and 60, and an approximately tubular exhaust gas discharge port 61 passes through both the lid plates 59 and 60. Further, a portion between both the lid plates 59 and 60 is a resonance chamber 63 which is communicated with an inner side of the filter case 52 via a plurality of communication pipes 62.

An exhaust gas introduction pipe 65 is inserted to the exhaust gas introduction port 55 which is formed in the one side portion of the casing 51. A leading end of the exhaust gas introduction pipe 65 protrudes to a side face in an opposite side to the exhaust gas introduction port 55 while cutting across the casing 51. A plurality of communication holes 66 which are open toward the filter case 52 are formed in an outer peripheral surface of the exhaust gas introduction pipe 65. A portion protruding to the side face in the opposite side to the exhaust gas introduction port 55 among the exhaust gas introduction pipe 65 is occluded by a lid body 67 which is detachably attached by screw thereto.

The DPF 50 is provided with a DPF temperature sensor 26 which detects a temperature of the exhaust gas within the DPF 50, as one example of detecting means. The DPF temperature sensor 26 of the embodiment is installed while passing through the casing 51 and the filter case 52, and a leading end of the DPF temperature sensor 26 is positioned between the diesel oxidation catalyst 53 and the soot filter 54.

Further, the DPF 50 is provided with a differential pressure sensor 68 which detects a clogged state of the soot filter 54, as one example of the detecting means. The differential pressure sensor 68 of the embodiment is structured such as to detect a pressure difference (a differential pressure) between upstream and downstream sides with respect to the soot filter 54 within the DPF 50. In this case, an upstream side exhaust gas pressure sensor 68a constructing the differential pressure sensor 68 is installed to the lid body 67 of the exhaust gas introduction pipe 65, and a downstream side exhaust gas pressure sensor 68b is installed between the soot filter 54 and the resonance chamber 63. It has been well known that a definite principle exists between the pressure difference between the upstream and downstream sides of the DPF 50, and a PM deposition amount within the DPF 50. In the embodiment, a renewing control (a DPF renewing control) of the soot filter 54 is executed by estimating the PM deposition amount within the DPF 50 from the pressure difference which is detected by the differential pressure sensor 68, and actuating the intake air throttle device 81 and the common rail 120 on the basis of the estimated result.

In this case, the clogged state of the soot filter 54 may be detected by an exhaust gas pressure sensor which detects the pressure in the upstream side of the soot filter 54 within the DPF 50, without being limited to the differential pressure sensor 68. In the case that the exhaust gas pressure sensor is employed, the clogged state of the soot filter 54 is determined by comparing a pressure (a reference pressure) in the upstream side of the soot filter 54 under a brand-new state in which the PM is not deposited up in the soot filter 54, with the current pressure which is detected by the exhaust gas pressure sensor.

In the structure mentioned above, the exhaust gas from the engine 5 enters into the exhaust gas introduction pipe 65 via the exhaust gas introduction port 55, is spouted out into the filter case 52 from each of the communication holes 66 which are formed in the exhaust gas introduction pipe 65, is dispersed into a wide region within the filter case 52, and thereafter passes through the diesel oxidation catalyst 53 and the soot filter 54 in this order so as to be purified. The PM in the exhaust gas can not pass through the porous partition wall between the cells in the soot filter 54 at this stage, and is collected. Thereafter, the exhaust gas passing through the diesel oxidation catalyst 53 and the soot filter 54 is discharged from the exhaust gas discharge port 61.

If the temperature of the exhaust gas exceeds a renewal boundary temperature (for example, about 300° C.) at a time when the exhaust gas passes through the diesel oxidation catalyst 53 and the soot filter 54, NO (nitrogen monoxide) in the exhaust gas is oxidized into an unstable $NO_2$ (nitrogen dioxide) on the basis of an action of the diesel oxidation catalyst 53. Further, a PM collecting capacity of the soot filter 54 is recovered (the DPF 50 is renewed) by oxidation removing the PM which is deposited in the soot filter 54, with O (oxygen) that $NO_2$ discharges at a time of returning to NO.

(3) Structure Relevant to Control of Engine

Figure 6:
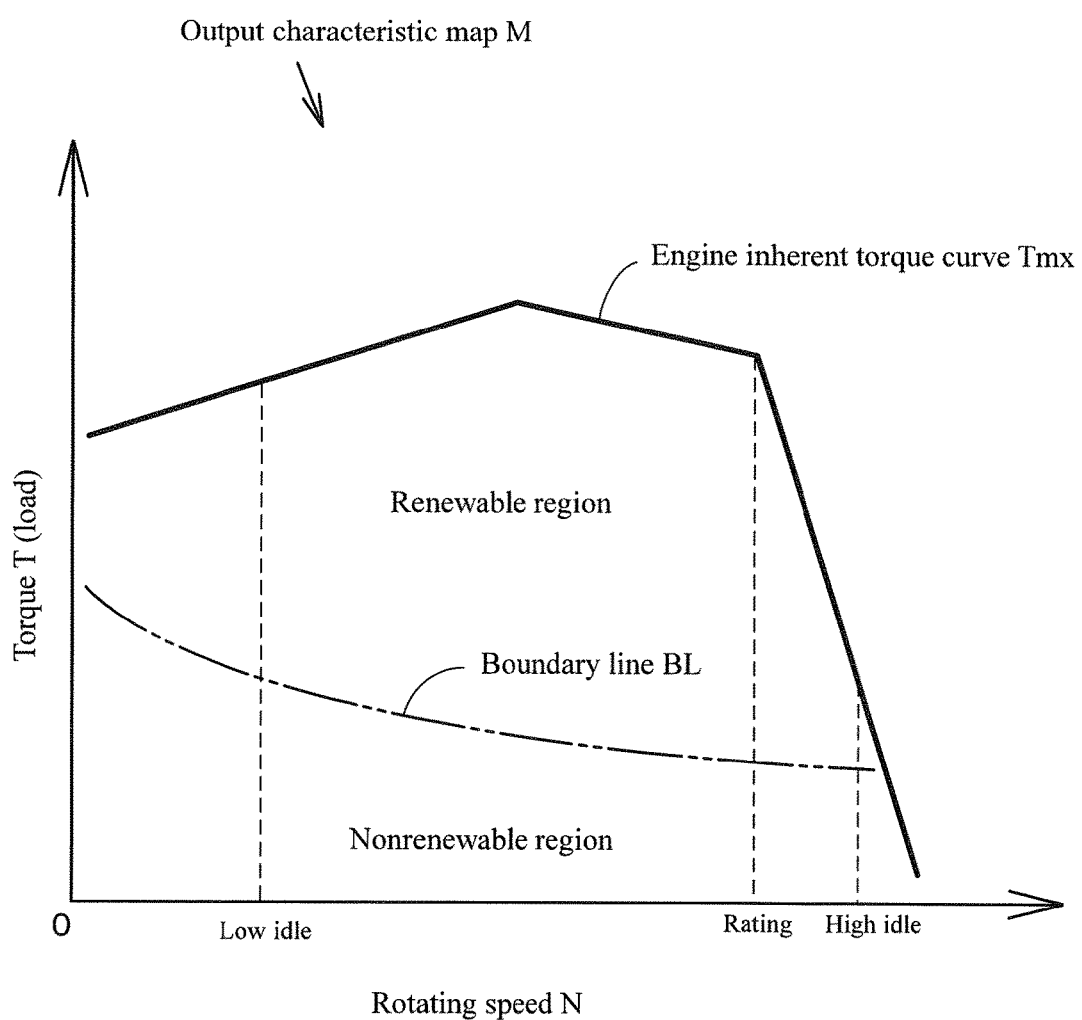
FIG. 6 is an explanatory view of an output characteristic map.

Next, a description will be given of a structure which is relevant to a control of the engine 70 with reference to FIG. 3, FIG. 5 and FIG. 6. As shown in FIG. 1, there is provided with an ECU 11 which actuates the fuel injection valve 119 in each of the cylinders in the engine 70. The ECU 11 has ROM 32 which previously stores various data in a fixed manner, EEPROM 33 which stores control programs and the various data in a rewritable manner, RAM 34 which temporarily stores the control programs and the various data, a timer 35 for measuring a time, and an input and output interface and the like, in addition to CPU 31 which executes various arithmetic processes and controls, and is arranged in the engine 70 or in the vicinity thereof.

To an input side of the ECU 11, there are connected at least a rail pressure sensor 12 which detects the fuel pressure within the common rail 120, an electromagnetic clutch 13 which rotates or stops the fuel pump 116, an engine speed sensor 14 which detects a rotating speed of the engine 70 (a position of a cam shaft of a crank shaft), an injection setting device 15 which detects and sets a fuel injection frequency (a frequency in one stroke fuel injection period) of the injector 115, a throttle position sensor 16 which detects an operating position of an accelerator operating device (not shown), an intake air temperature sensor 17 which detects a temperature of the intake air in an intake air route, an exhaust gas temperature sensor 18 which detects a temperature of the exhaust gas in an exhaust gas route, a cooling water temperature sensor 19 which detects a temperature of a cooling water in the engine 70, a fuel temperature sensor 20 which detects a temperature of the fuel within the common rail 120, the differential pressure sensor 68 (the upstream side exhaust gas pressure sensor 68a and the downstream side exhaust gas pressure sensor 68b), a DPF temperature sensor 26 which detects a temperature of the exhaust gas within the DPF 50, a mode selection switch 45 serving as mode selection input means which selects whether an automatic auxiliary renewing mode mentioned later is executed or a reset renewing mode (which may be also called as a forced renewing mode) is executed, an elevation lever position sensor 46 which detects an angle of a rotational operation (an operating amount) of the fork elevating lever 235, and a tilt lever position sensor 47 which detects an angle of a rotational operation (an operating amount) of the tilt lever 236.

Each of electromagnetic solenoids of the fuel injection valves 119 for at least four cylinders is connected to an output side of the ECU 11. In other words, it is structured such that the high-pressure fuel stored in the common rail 120 is injected from the fuel injection valve 119 separately at a plurality of times in one stroke while controlling a fuel injection pressure, an injection timing and an injection period, thereby suppressing the nitrogen oxide (NOx) from being generated, executing a complete combustion in which the generation of the PM and a carbon dioxide is reduced, and improving a fuel consumption.

Further, to an output side of the ECU 11, there are connected the intake air throttle device 81 for adjusting an intake air pressure (an intake air amount) of the engine 70, the exhaust gas throttle device 82 for adjusting an exhaust gas pressure of the engine 70, an ECU failure lamp 22 which gives a warning and informs of a failure of the ECU 11, an exhaust gas temperature warning lamp 23 which informs of an abnormal temperature (an abnormally low temperature and an abnormally high temperature) of the exhaust gas within the DPF 50, a renewal lamp 24 which turns on with a renewing motion of the DPF 50, and a renewal inhibition lamp 28 serving as renewal inhibition informing means which is actuated during the inhibition of the renewing motion of the DPF 50. Data relating to blinking of each of the lamps 22 to 24 and 28 is previously stored in the EEPROM 33 of the ECU 11. Though details will be mentioned later, the renewal lamp 24 constructs a single display device serving as renewal advance notifying means which is actuated before executing the automatic auxiliary renewing mode, forced renewal advance notifying means which is actuated before executing the reset renewing mode, and renewal informing means which informs of the matter that the DPF 50 is under renewing motion. In this case, as shown in FIG. 7, the mode selection switch 45 and each of the lamps 22 to 24 and 28 are provided in an instrument panel 40 which is in a working machine to be mounted with the engine 70.

Figure 7:
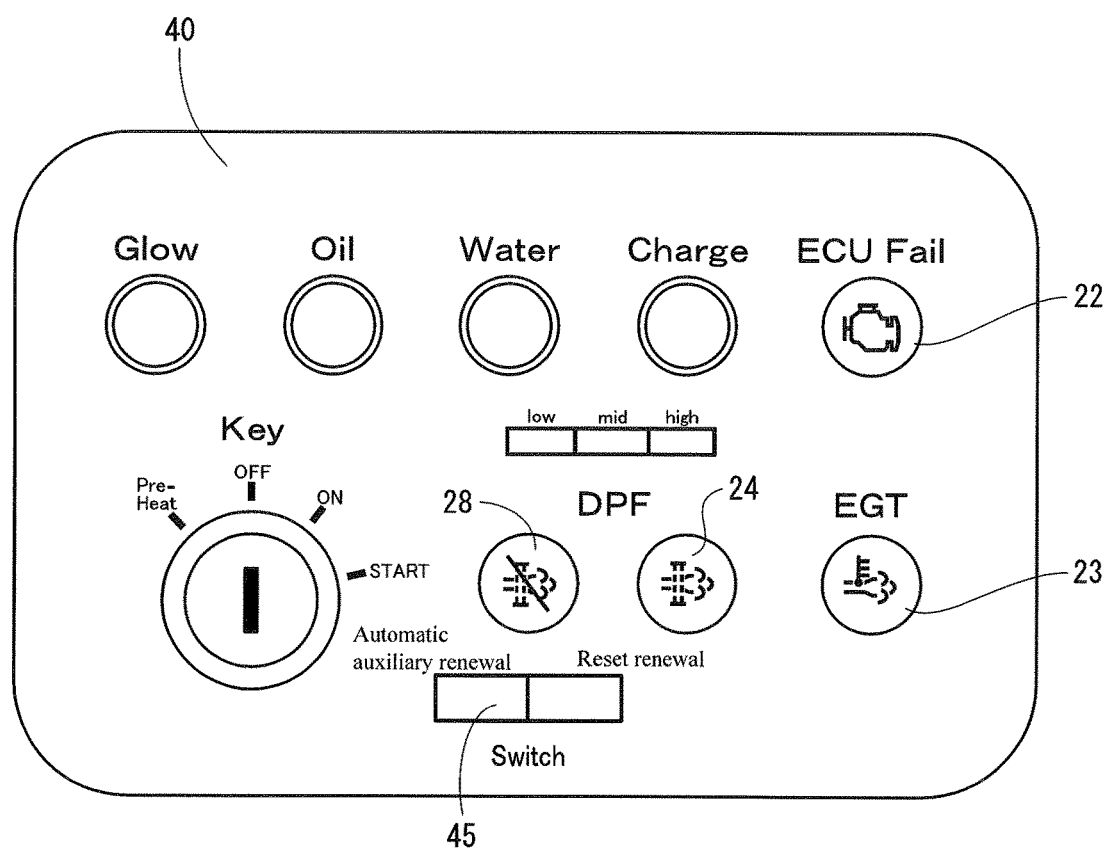
FIG. 7 is an explanatory view of an instrument panel.

The mode selection switch 45 is a switch of a rocker (seesaw) type, and is structured such that the automatic auxiliary renewing mode is executed depending on the clogged state of the DPF 50 by keeping pushing down one end side (a left side in FIG. 7), and the reset renewing mode is executed depending on the clogged state of the DPF 50 by keeping pushing down the other end side (a right side in FIG. 7). Further, through details will be mentioned later, it is structured such as to maintain the current drive state in the engine 70 and inhibit the execution of the automatic auxiliary renewing mode and the reset renewing mode, while the operator operates the fork elevating lever 235 or the tilt lever 236. In other words, the forced drive of the engine 70 and the post injection in which the temperature of the exhaust gas rises are prevented, while the operator operates the fork elevating lever 235 or the tilt lever 236.

An output characteristic map M (refer to FIG. 6) indicating a relationship between a rotating speed N and a torque T (a load) of the engine 70 is previously stored in the EEPROM 33 of the ECU 11. The output characteristic map M is determined by an experiment or the like. In the output characteristic map M shown in FIG. 6, the rotating speed N is employed as a transverse axis, and the torque T is employed as a vertical axis. The output characteristic map M is a region which is surrounded by a solid line Tmx drawn convex upward. The solid line Tmx is a maximum torque line which indicates a maximum torque with respect to each of the rotating speed N. In this case, if the type of the engine 70 is the same, the output characteristic maps M stored in the ECU 11 are identical (common). As shown in FIG. 6, the output characteristic map M is segmented up anti down by a boundary line BL which expresses a relationship between the rotating speed N and the torque T in the case that the temperature of the exhaust gas is a renewal boundary temperature (about 300° C.). A region in an upper side with respect to the boundary line BL is a renewable region in which the PM deposited in the soot filter 54 can be oxidized and removed (in which an oxidizing action of the oxidation catalyst 53 works), and a region in a lower side is a nonrenewable region in which the PM is deposited in the soot filter 54 without being oxidized and removed.

The ECU 11 basically executes a fuel injection control which computes the torque T on the basis of the output characteristic map M, the rotating speed N which is detected by the engine speed sensor 14, and the throttle position which is detected by the throttle position sensor 16 so as to determine a target fuel injection amount, and actuates the common rail system 117 on the basis of the result of computation. In this case, the fuel injection amount is adjusted by adjusting a valve open period of each of the fuel injection valves 119, and changing an injection period into each of the injectors 115.

(4) Aspect of DPF Renewing Control

Next, a description will be given of one example of the renewing control of the DPF 50 by the ECU 11 with reference to flow charts in FIG. 8 and FIG. 9. In this case, the control mode of the engine 70 (the control type relating to the renewal of the DPF 50) in the embodiment includes at least a normal drive mode which carries out a road travel and various works, an automatic auxiliary renewing mode which automatically raises the temperature of the exhaust gas if the clogged state of the DPF 50 is equal to or higher than a prescribed level, a reset renewing mode (which may be called also as a forced renewing mode) which supplies the fuel into the DPF 50 by a post injection E, and a limp home mode which sets the engine 70 to a minimum drive state (makes the working machine secure a minimum travel function).

In the automatic auxiliary renewing mode, an intake air amount and an exhaust gas amount are limited by closing at least one of the intake air throttle device 81 and the exhaust gas throttle device 82 to a predetermined opening degree, on the basis of the detected information of the differential pressure sensor 68. Accordingly, since the load of the engine 70 is increased, in conjunction with this, the output of the engine 70 is increased only at an increasing amount of the engine load, and the temperature of the exhaust gas from the engine 70 is raised. As a result, it is possible to burn and remove the PM within the DPF 50 (the soot filter 54).

The reset renewing mode (the forced renewing mode) is executed in the case that the clogged, state of the DPF 50 is not improved (the PM remains) even by executing the automatic auxiliary renewing mode, and the case that an accumulated drive time Te of the engine 70 exceeds a set time T0 (for example, about 100 hours). In the reset renewing mode, the temperature of the exhaust gas within the DPF 50 is raised (about 560° C.), by supplying the fuel into the DPF 50 by the post injection E, and burning the fuel by the diesel oxidation catalyst 53. As a result, it is possible to forcibly burn and remove the PM within the DPF 50 (the soot filter 54).

The limp home mode is executed in the case that the clogged state of the DPF 50 is not improved even by executing the reset renewing mode, and the PM is excessively deposited (a possibility of the PM runway combustion is high). In the limp home mode, the engine 70 is held in a minimum drive state by limiting an upper limit of the output (the rotating speed N and the torque T) of the engine 70, and a drivable time of the engine 70. As a result, it is possible to get out the working machine (the fork lift car 220), for example, from a work area or move it to a dealership or a service center. In other words, it is possible to make the working machine (the fork lift car 220) secure the minimum traveling function.

As is known from the description relating to each of the modes mentioned above, for example, the engine 70, the intake air throttle device 81, the exhaust gas throttle device 82 and the common rail system 117 are the members which involved in the renewing motion of the DPF 50. These elements 70, 81, 82 and 117 construct the renewing device for burning and removing the PM within the DPF 50.

Figure 8:
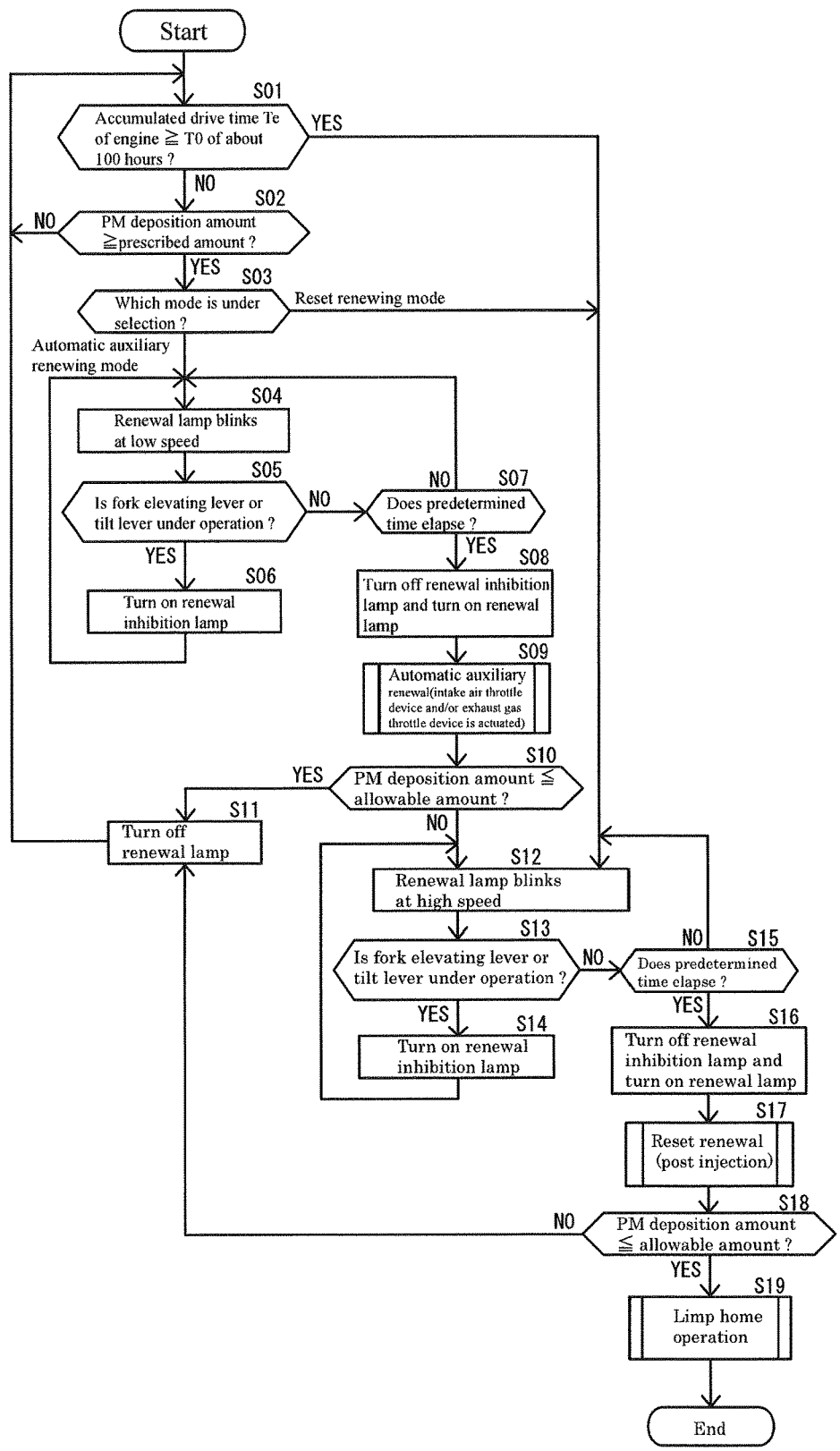
FIG. 8 is a flow chart showing a flow of a DPF renewing control.

As shown in FIG. 8, each of the modes mentioned above is executed on the basis of a command of the ECU 11. In other words, an algorithm shown by a flow chart in FIG. 8 is stored in the EEPROM 33. Further, each of the modes mentioned above is executed by calling the algorithm to the RAM 34 and processing in the CPU 31.

As shown by the flow chart in FIG. 8, in the renewing control of the DPF 50, it is firstly determined whether the accumulated drive time Te of the engine 70 is equal to or more than the set time T0 (S01). The normal drive mode is executed in this stage. The set time T0 of the embodiment is set, for example, to about 100 hours. In this case, the accumulated drive time Te of the engine 70 is measured by using a time information of a timer 35 in the ECU 11 while the engine 70 is driven, and is stored and accumulated in the EEPROM 33.

If the accumulated drive time Te is equal to or more than the set time T0 (S01: YES), the step goes to a step S12 mentioned later. If the accumulated drive time Te is less than the set time T0 (S01: NO), the PM deposition amount within the DPF 50 is next estimated on the basis of the detected result by the differential pressure sensor 68, and it is determined whether the estimated result is equal to or more than a prescribed amount (a prescribed level) (S02). In the case that it is judged that the PM deposition amount is less than the prescribed amount (S02: NO), the step goes back to the step S01 and the normal drive mode is proceeded. The prescribed amount of the embodiment is set, for example, to 8 g/l. In the case that it is judged that the PM deposition amount is equal to or more than the prescribed amount (S02: NO), it is determined which mode is under selection by the mode selection switch 45 (S03). In the case that the reset renewing mode is under selection, the step goes to a step S12 mentioned later. In the case that the automatic auxiliary renewing mode is under selection, the execution of the renewing motion of the DPF 50 (the automatic auxiliary renewing mode) is advance notified to the operator, by making the renewal lamp 24 blink at a low speed (S04). In this case, a blinking frequency of the renewal lamp 24 is set, for example, to 1 Hz.

Next, it is determined whether at least one of the fork elevating lever 235 and the tilt lever 236 is under operation (S05), and if it is under operation (S05: YES), the renewal inhibition lamp 28 is turned on (S05), and the step thereafter goes back to the step S04. Accordingly, in the steps S04 to S06, the control mode of the engine 70 stays in the normal drive mode despite that the PM deposition amount is equal to or more than the prescribed amount, and the current drive state in the engine 70 is maintained. In other words, a change to the automatic auxiliary renewing mode (which may be called as the renewing motion of the DPF 50 or the actuation of the renewing device) is inhibited. Further, while at least one of both the levers 235 and 236 is operated, the fact that the renewing motion of the DPF 50 (the automatic auxiliary renewing mode) is inhibited is visually appealed to the operator, by turning on the renewal inhibition lamp 28, thereby calling the operator's attention securely.

In the step S05, if none of the levers 235 and 236 are under operation (S05: NO), it is determined whether a predetermined time elapses in a state in which none of the levers 235 and 236 are operated (S07). If the predetermined time does not elapse (S07: NO), the step goes back to the step S04 as it is. If the predetermined time elapses (S07: YES), the renewal inhibition lamp 28 is turned off, and after the renewal lamp 24 blinking at a low speed is turned on (S08), the automatic auxiliary renewing mode is executed (S09).

In the automatic auxiliary renewing mode, the load of the engine 70 is increased by limiting the intake air amount or the exhaust gas amount using at least one of the intake air throttle device 81 and the exhaust gas throttle device 82 as mentioned above, the output of the engine 70 is increased based on this, and the temperature of the exhaust gas is raised. As a result, the PM within the DPF 50 is burnt and removed, and the PM collecting capacity of the DPF 50 is recovered. The automatic auxiliary renewing mode of the embodiment is executed, for example, for about twenty minutes, and after an elapse of the time, the opening degrees of the intake air throttle device 81 and the exhaust gas throttle device 82 return to the original state before being narrowed.

After the execution of the automatic auxiliary renewing mode, the PM deposition amount within the DPF 50 is estimated again on the basis of the detected result from the differential pressure sensor 68, and it is determined whether the estimated result is equal to or less than an allowable amount (S10). In the case that it is judged that the PM deposition amount is equal to or less than the allowable amount (S10: YES), an end of the automatic auxiliary renewing mode is informed by turning off the renewal lamp 24 (S11), and the step returns to the step S01 so as to execute the normal drive mode. The allowable amount of the embodiment is set, for example, to 4 g/l. In the case that it is judged that the PM deposition amount exceeds the allowable amount (S10: NO), there comes to a state in which the PM within the DPP 50 is not sufficiently removed (the clogged state is not improved) in spite of the execution of the automatic auxiliary renewing mode. Accordingly, the renewal lamp 24 is blinked at a high speed (S12), and advance notifies the operator of the execution of the renewing motion of the DPF 50 (the reset renewing mode). In this case, a blinking frequency of the renewal lamp 24 is set to a frequency which is different from that in the automatic auxiliary renewing mode. For example, the blinking frequency of the renewal lamp 24 for advance notifying the reset renewing mode is set to 2 Hz.

Next, it is determined whether at least one of the fork elevating level 235 and the tilt lever 236 is under operation (S13), and if it is under operation (S04: YES), the renewal inhibition lamp 28 is turned on (S14) and thereafter the step returns to the step S12. Therefore, in the steps S12 to S14, the current drive state in the engine 70 is maintained in spite of the fact that the clogged state of the DPF 50 is not improved, and the change to the reset renewing mode is inhibited. Further, in this case, while at least one of both the levers 235 and 236 is operated, the fact that the renewing motion of the DPF 50 (the reset renewing mode) is inhibited is visually appealed to the operator by turning on the renewal inhibition lamp 28, thereby calling the operator's attention securely.

In the step S13, if none of the levers 235 and 236 are under operation (S13: NO), it is determined whether a predetermined time elapses in the state in which none of the levers 235 and 236 are operated (S15). If the predetermined time does not elapse (S15: NO), the step returns to the step S12 as it is. If the predetermined time elapses (S15: YES), the renewal inhibition lamp 28 is turned off, and after the renewal lamp 24 which blinks at the high speed is turned on (S16), the reset renewing mode is executed (S17).

In the reset renewing mode, as mentioned above, the temperature of the exhaust gas within the DPF 50 is raised by supplying the fuel into the DPF 50 by the post injection E of the common rail system 117 and burning the fuel by the diesel oxidation catalyst 53. As a result, the PM within the DPF 50 is forcibly burnt and removed, and the PM collecting capacity of the DPF 50 is recovered. The reset renewing mode of the embodiment is executed, for example, for about 30 minutes, and the common rail system 117 does not carry out the post injection E after the elapse of the time. If the reset renewing mode is executed, the accumulated drive time Te of the engine 70 is reset, and is newly measured by using the time information of the timer 35.

After the execution of the reset renewing mode, the PM deposition amount within the DPF 50 is estimated on the basis of the detected result by the differential pressure sensor 68, and it is determined whether the estimated result is equal to or less than an allowable amount (S18). In the case that it is judged that the PM deposition amount is equal to or less than the allowable amount (S18: YES), the end of the reset renewing mode is informed by turning off the renewal lamp 24 (S11), and the step returns to the step S01 and the normal drive mode is executed. In the case that it is judged that the PM deposition amount exceeds the allowable amount (S18: NO), it is thought that there comes to the PM excessively deposited state in which the clogged state of the DPF 50 is not improved in spite of the execution of the reset renewing mode. In this case, since there is a risk of a possibility of the PM runaway combustion, the limp home mode is executed (S19). In the limp home mode, as mentioned above, the engine 70 is held to the minimum drive state by limiting the upper limit value of the output (the rotating speed N and the torque T) of the engine 70, and the drivable time of the engine 70. As a result, it is possible to secure a minimum traveling function in the working machine (the fork lift car 220).

Figure 9:
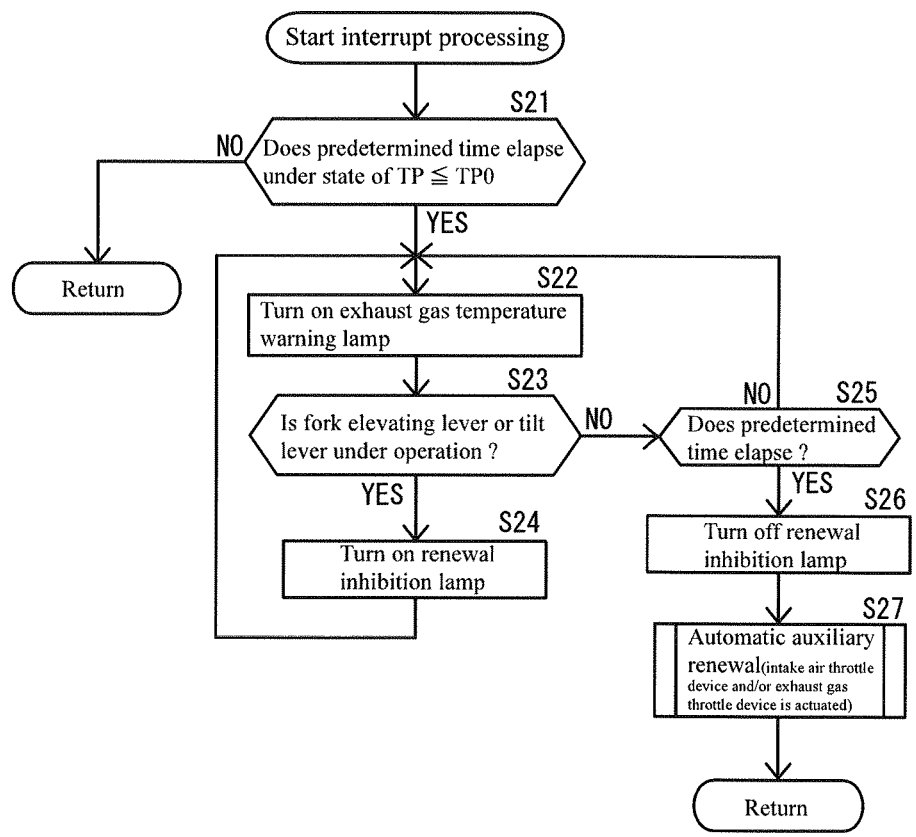
FIG. 9 is a flow chart showing an intervention process.

In this case, the ECU 11 of the embodiment is structured such as to execute an interrupt processing shown in FIG. 9 during the execution of the renewing control of the DPF 50. The interrupt processing is structured such as to check the detected result of the DPF temperature sensor 26 at appropriate time intervals. In this case, as shown by a flow chart in FIG. 9, it is determined whether a predetermined time elapses in a state in which a temperature TP of the exhaust gas within the DPF 50 is equal to or less than a prescribed temperature TP0 (S21). In the case that the predetermined time elapses at the prescribed temperature TP0 or less (S21: YES), the exhaust gas temperature warning lamp 23 is blinked (S22) and advance notifies the operator of the execution of the renewing motion of the DPF 50 (the automatic auxiliary renewing mode). The prescribed temperature TP0 comes to a temperature which is lower than the renewal boundary temperature (for example, about 300° C.). In other words, as the prescribed temperature TP0, nonrenewable temperature at which the PM is deposited in the soot filter 54 without being oxidized and removed is employed. The prescribed temperature TP0 of the embodiment is set, for example, to about 250° C. In this case, the blinking frequency of the exhaust gas temperature warning lamp 23 is set, for example, to 1 Hz.

Next, it is determined whether at least one of the fork elevating lever 235 and the tilt lever 236 is under operation (S23). If it is under operation (S23: YES), the renewal inhibition lamp 28 is turned on (S24) and thereafter the step returns to the step S22. If none of the levers 235 and 236 are under operation (S23: NO), it is determined whether a predetermined time elapses in the state in which none of the levers 235 and 236 are operated (S25). If the predetermined time does not elapse (S25: NO), the step returns to the step S22 as it is. After the predetermined time elapses (S25: YES), after the renewal inhibition lamp 28 is turned off (S26), the automatic auxiliary renewing mode is executed (S27), and thereafter returns.

Since the PM is not necessarily deposited within the DPF 50 in the automatic auxiliary renewing mode in this case, an executing time is shorter than that in the automatic auxiliary renewing mode in the step S09. In the embodiment, whereas the executing time of the automatic auxiliary renewing mode in the step S09 is, for example, about 20 minutes, the executing time of the automatic auxiliary renewing mode in the step S27 is, for example, about 5 minutes which is one fourth. After the elapse of the time, the opening degrees of the intake air throttle device 81 and the exhaust gas throttle device 82 are returned to the original state before being narrowed.

(5) Summary

As is apparent from the above description and FIGS. 3, 7 and 8, since the system includes with the common rail 120 type engine 70 which is mounted to the working machine 220, the exhaust gas purification device 50 which is arranged in the exhaust system 77 of the engine 70, and at least one of the intake air throttle device 81 and the exhaust gas throttle device 82 which are arranged in the intake and exhaust systems 76 and 77 of the engine 70, it is structured so as to execute the auxiliary renewing mode which raises the temperature of the exhaust gas from the engine 70 by actuating the at least one throttle device 81 or 82, and the forced renewing mode which supplies the fuel into the exhaust gas purification device 50 on the basis of the post injection E, and it is provided with the mode selection input means 45 which selects whether the auxiliary renewing mode is executed or the forced renewing mode is executed in the case that the clogged state of the exhaust gas purification device 50 is equal to or more than the prescribed level, the operator can select the control mode (the control type relating to the renewal of the exhaust gas purification device 50) of the engine 70 depending on the working state, on the basis of the operation of the mode selection input means 45. Accordingly, it is possible to restrict a loss of a working time caused by a point that it takes a long time to renew the exhaust gas purification device 50 by the throttle device 81 or 82, and there can be achieved an effect that an improvement of a working efficiency can be achieved.

As is apparent from the description and FIGS. 3 and 8, since it is structured such that in the case that the clogged state of the exhaust gas purification device 50 is not improved even by executing the auxiliary renewing mode, the forced renewing mode is executed regardless of the selection state of the mode selection input means 45, it is possible to smoothly change from the auxiliary renewing mode to the forced renewing mode which can forcibly and efficiently burn and remove a particulate matter within the exhaust gas purification device 50, without any re-operation of the mode selection input means 45 by the operator so as to reselect the forced renewing mode. Therefore, it is possible to securely burn and remove the particulate matter within the exhaust gas purification device 50, in correspondence to a condition that the clogged state of the exhaust gas purification device 50 is not improved, while omitting a labor hour for operating the mode selection input means 45 and there can be achieved an effect that it is possible to prevent a malfunction of the exhaust gas purification device 50 and the engine 70 caused by the clogging of the particulate matter.

As is apparent from the description and FIGS. 3, 7 and 8, since there is provided the forced renewal advance notifying means 24 which is actuated before the forced renewing mode is executed, the operator can previously comprehend the fact that the mode changes to the forced renewing mode, on the basis of the actuation of the forced renewal advance notifying means 24, in the case that the clogged state of the exhaust gas purification device 50 is not improved and the mode changes to the forced renewing mode, and can assume previously the shock of the output fluctuation and the change of the engine sound which are generated thereafter. Therefore, there can be achieved an effect that it is possible to do away with an uncomfortable feeling of the operator which is caused by the renewing motion of the exhaust gas purification device 50.

As is apparent from the description and FIGS. 2, 3 and 8, since it is structured such that the auxiliary renewing mode is not executed regardless of the clogged state of the exhaust gas purification device 50, during the operation of the operating means 235 and 236 with respect to the working portion 227 which is provided in the working machine 220, it is possible to inhibit the renewing motion of the exhaust gas purification device 50 by actuating the operating means 235 and 236 with respect to the working portion 227. In other words, it is possible to inhibit the renewing motion of the exhaust gas purification device 50, on the basis of an intention of the operator depending on the working state of the working machine 220 or the like. Accordingly, the operator can smoothly carry out the careful work which is executed on the basis of the engine sound, while it is possible to execute the renewing control of recovering the particulate matter collecting capacity of the exhaust gas purification device 50. In other words, there can be achieved an effect that it is possible to do away with the defect of renewing motion of the exhaust gas purification device 50 which may obstruct the careful work.

As is apparent from the description and FIGS. 3, 7 and 8, since there is provided the renewal inhibition informing means 28 which is actuated in the case that the auxiliary renewing mode is not executed under the condition that the clogged state of the exhaust gas purification device 50 is equal to or more than the prescribed level, it is possible to visually appeal to the operator the fact that the renewing motion of the exhaust gas purification device 50 is inhibited, by the information of the renewal inhibition informing means 28, while the operating means 235 or 236 are operated with respect to the working portion 227, and it is possible to securely call the operator's attention. It is possible to easily confirm whether or not the renewal is under inhibition, by checking the state of the renewal inhibition informing means 28.

As is apparent from the description and FIGS. 3 and 8, since it is structured such that the execution inhibition of the auxiliary renewing mode is released in the case that the predetermined time elapses in the non-operation state after the end of the operation of the operating means 235 or 236, under the condition that the clogged state of the exhaust gas purification device 50 is equal to or more than the prescribed level, the renewing motion of the exhaust gas purification device 50 is not executed as soon as the operation of the operating means 235 or 236 is finished (the renewing motion of the exhaust gas purification device 50 is executed after a certain degree of delay time elapses). Accordingly, there can be achieved an effect that it is possible to smoothly change to the renewing motion of the exhaust gas purification device 50 by reducing the uncomfortable feeling applied to the operator as much as possible.

As is apparent from the description and FIGS. 3 and 9, since it is structured such that the auxiliary renewing mode is executed regardless of the clogged state of the exhaust gas purification device 50, in the case that the temperature of the exhaust gas within the exhaust gas purification device 50 is equal to or less than the previously set prescribed temperature TP0, it is possible to positively raise the temperature of the exhaust gas even under a condition that the temperature of the exhaust gas tends to be lowered, such as the case that the exhaust gas purification device 50 is arranged away from the engine 70, so that it is possible to reduce and delay a deposition of the particulate matter within the exhaust gas purification device 50. Even in the case that the exhaust gas purification device 50 is arranged away from the engine 70, it is possible to maintain the purifying function and the renewing function of the exhaust gas purification device 50 over a long time period.

As is apparent from the description and FIGS. 3, 8 and 9, since it is structured so as to come back to the normal operation mode after the predetermined time elapses, in the ease that the auxiliary renewing mode is executed on the basis of the temperature of the exhaust gas within the exhaust gas purification device 50, it is not necessary for the operator to carry out a returning operation, for example, for returning to the normal operation mode. Therefore, there can be achieved an effect that a labor hour for the operation can be omitted and it is possible to reduce an operation load of the operator.

As is apparent from the description and FIGS. 3 and 9, since the executing time of the auxiliary renewing mode on the basis of the temperature of the exhaust gas within the exhaust gas purification device 50 is set shorter than the executing time of the auxiliary renewing mode on the basis of the clogged state of the exhaust gas purification device 50, it is possible to suppress the loss of the working time due to the temperature rise of the exhaust gas using the throttle devices 81 and 82 as much as possible. As a result, there can be achieved an effect that it can be a help of an improvement of the working efficiency.

(6) Other Example in the Case that Engine is Mounted to Backhoe

Figure 10:
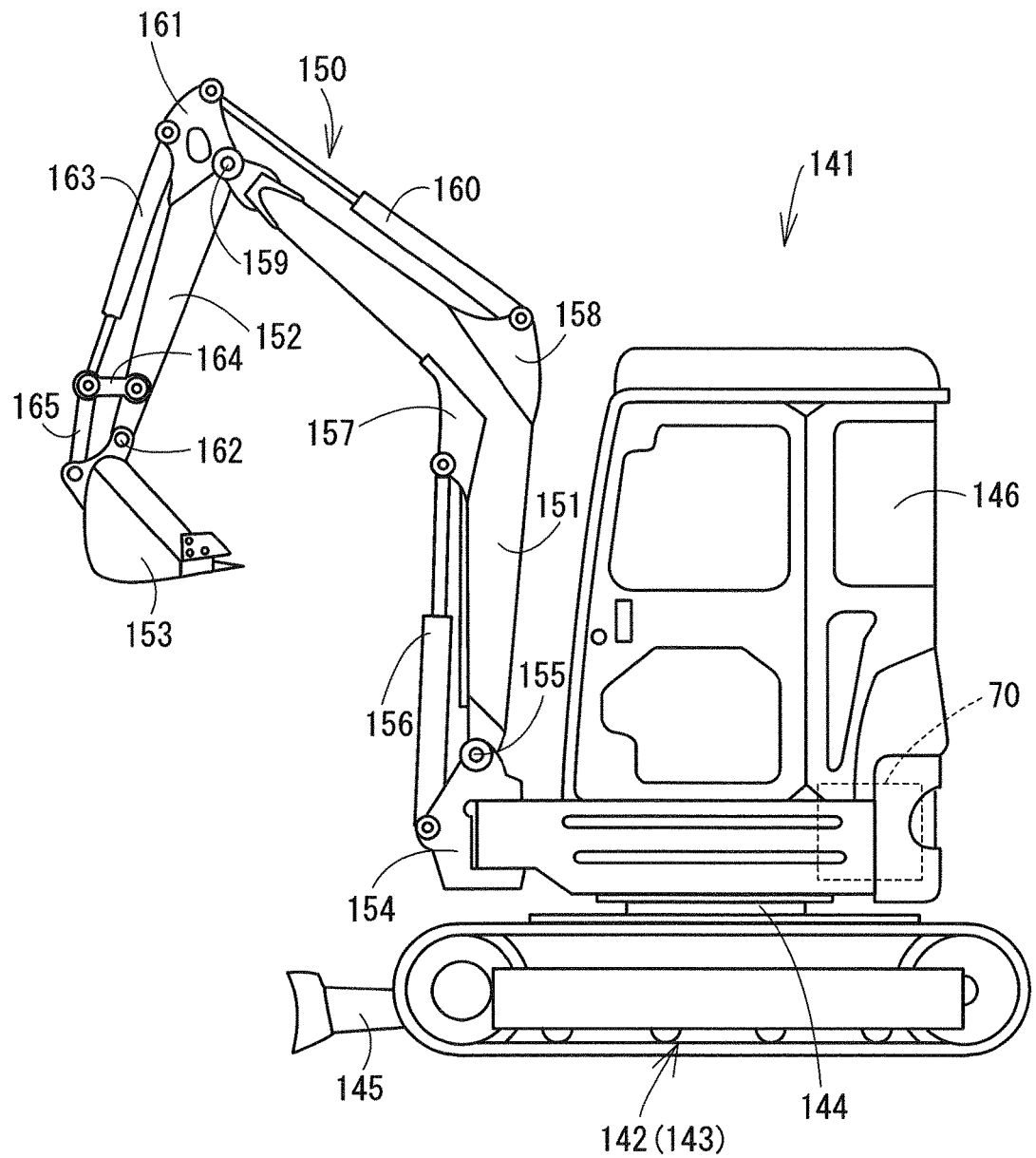
FIG. 10 is a side elevational view of a backhoe to which the engine is mounted.
Figure 11:
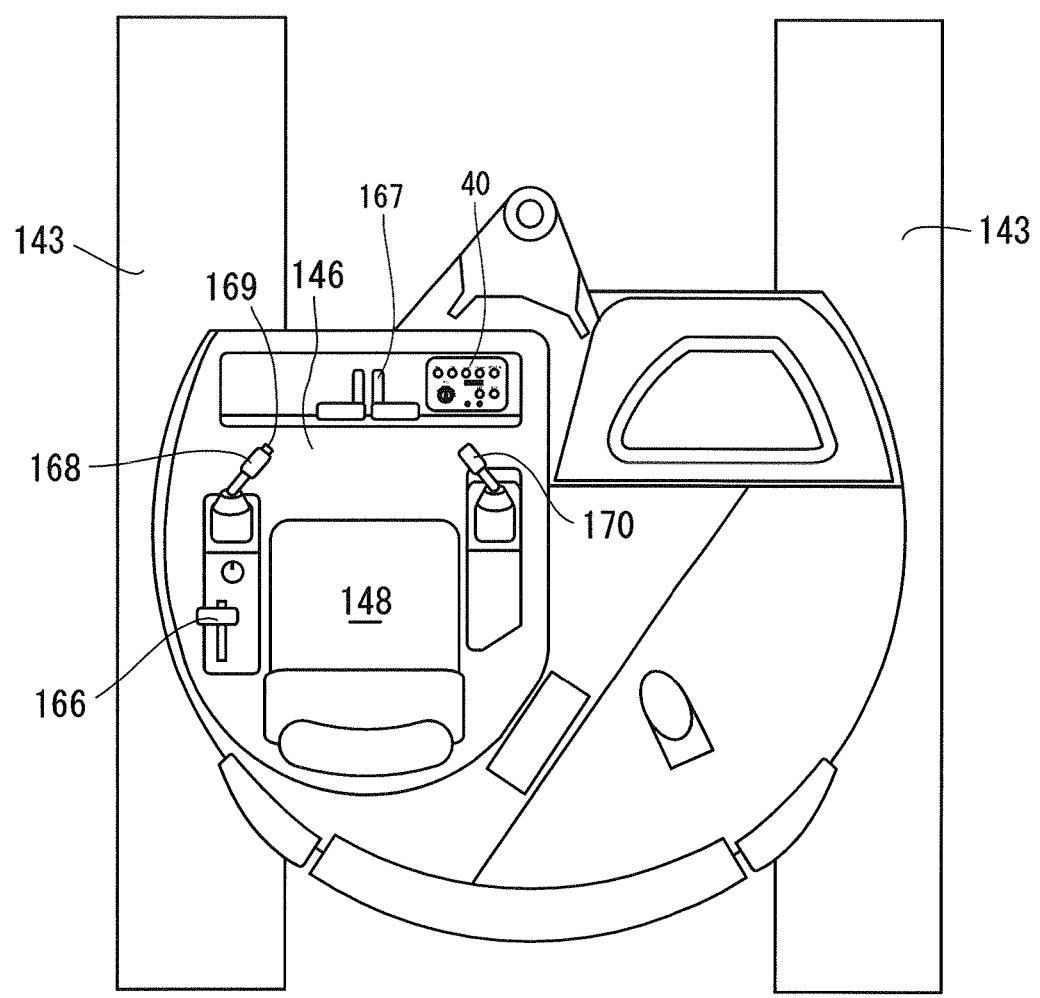
FIG. 11 is a plan view of the backhoe.
Figure 12:
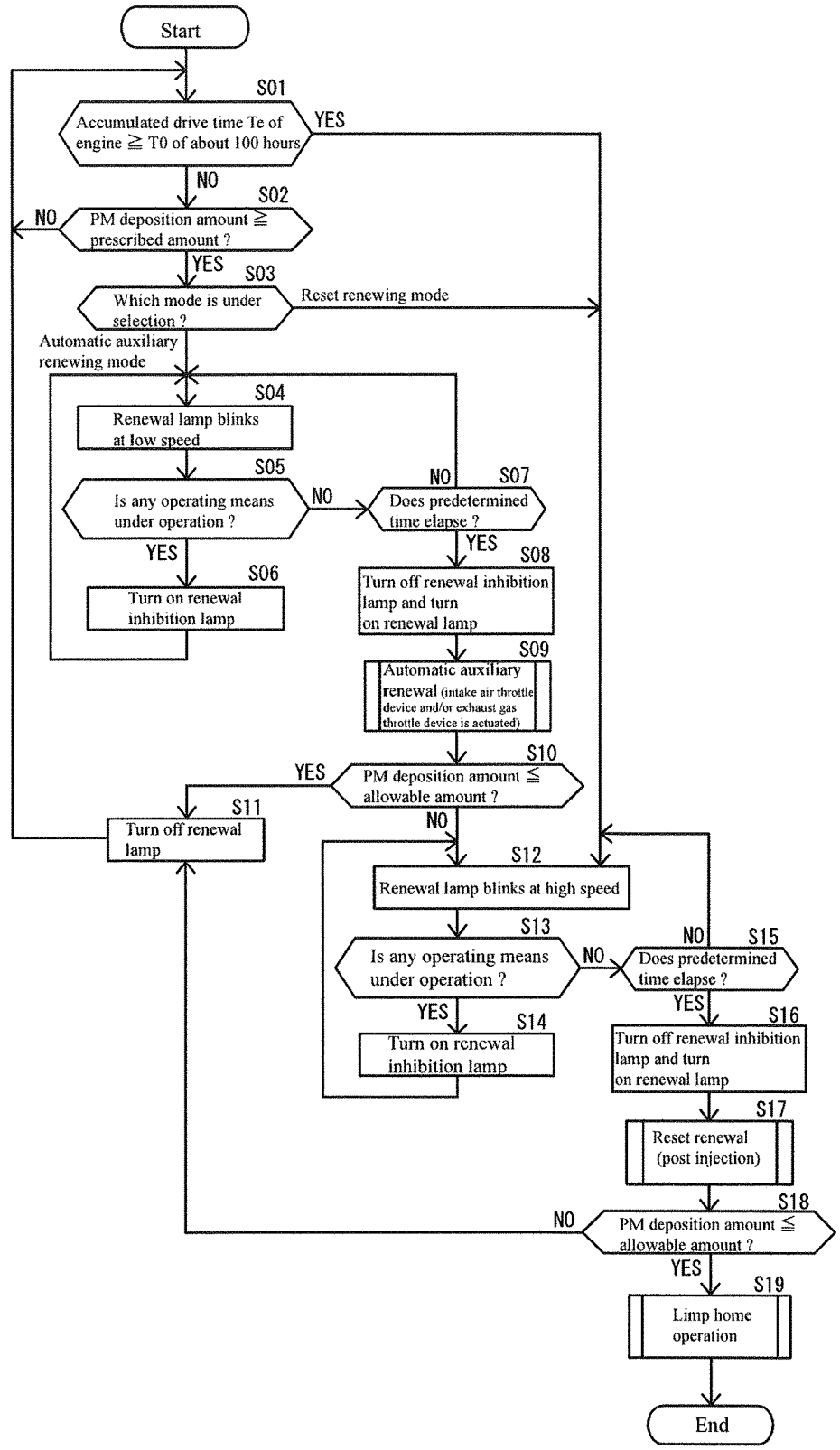
FIG. 12 is a flow chart showing a flow of the DPF renewing control in the case that the engine is mounted to the backhoe.
Figure 13:
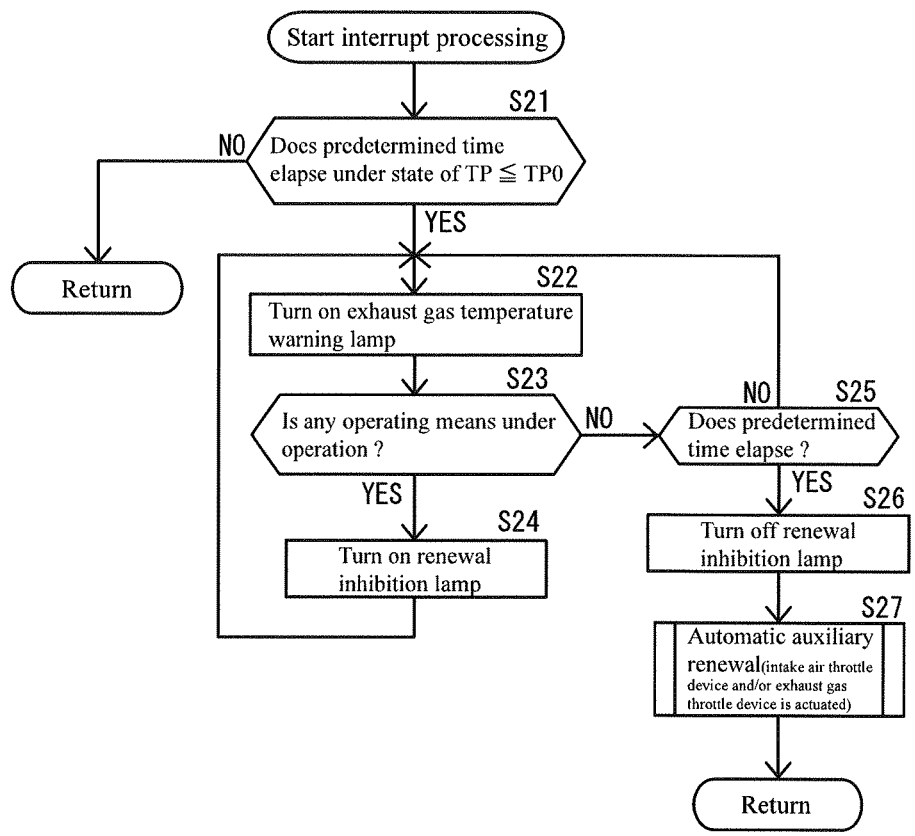
FIG. 13 is a flow chart showing an intervention process in the case that the engine is mounted to the backhoe.

FIGS. 10 to 13 show the other example in the case that the engine 70 is mounted to a backhoe 141 which serves as the working machine. In this case, in FIG. 11, for convenience of explanation, an illustration of a cabin 146 is omitted. The backhoe 141 is provided with a crawler type traveling device 142 which has a pair of right and left traveling crawlers 143 (only a left side is shown in FIG. 10), and a swing table 144 (a machine body) which is provided on the traveling device 142. The swing table 144 is structured such as to be horizontally swingable over all directions at 360 degrees, by a swing motor (not shown). A blade 145 is installed to a front portion of the traveling device 142 so as to be movable up and down and rotatable.

The cabin 146 serving as a control portion and the diesel four-cylinder type engine 70 are mounted to the swing table 144. A front portion of the swing table 144 is provided with a working portion 150 which has a boom 151, an arm 152 and a bucket 153 for an excavating work. As in detail shown in FIG. 11, in an inner portion of the cabin 146, there are arranged a control seat 148 on which the operator seats, a throttle lever 166 serving as throttle operating means which sets and holds an output rotating speed of the engine 70, and lever switch groups 167 to 170 (a swing operating lever 167, an arm operating lever 168, a bucket operating switch 169 and a boom operating lever 170) which serve as operating means with respect to the working portion 150.

The boom 151 which corresponds to a constituting element of the working portion 150 has a leading end side protruding forward and is formed as a shape which is bent like a V-shape as viewed from the side. A base end portion of the boom 151 is pivoted to a boom bracket 154 which is attached to a front portion of the swing table 144 so as to be swingable and rotatable around a transverse boom shaft 155. A boom cylinder 156 of a single rod double action type for swinging and rotating the boom 151 up and down is arranged in a side of an inner surface (a front face) of the boom 151. A cylinder side end portion of the boom cylinder 156 is pivoted rotatably to a front end portion of the boom bracket 154. A rod side end portion of the boom cylinder 156 is pivoted rotatably to a front bracket 157 which is fixed to a front face side (a concave side) of the bent portion in the boom 151.

A base end portion of the arm 152 having a longitudinally rectangular tube shape is pivoted to a leading end portion of the boom 151 so as to be swingable and rotatable around a transverse arm shaft 159. An arm cylinder 160 of a single rod double action type for swinging and rotating the arm 152 is arranged in a front portion side of an upper face of the boom 151. A cylinder side end portion of the arm cylinder 160 is pivoted rotatably to a rear bracket 158 which is fixed to a back face side (a protruding side) of the bent portion in the boom 151. A rod side end portion of the arm cylinder 160 is pivoted rotatably to an arm bracket 161 which is firmly fixed to an outer surface (a front face) in a base end side of the arm 152.

The bucket 153 which serves as an excavating attachment is pivoted to a leading end portion of the arm 152 so as to freely scoop and rotate around a transverse bucket shaft 162. In a side of an outer face (a front face) of the arm 152, there is arranged a bucket cylinder 163 of a single rod double action type for scooping and rotating the bucket 153. A cylinder side end portion of the bucket cylinder 163 is pivoted rotatably to the arm bracket 161. A rod side end portion of the bucket cylinder 163 is pivoted rotatably to the bucket 153 via a connection link 164 and a relay rod 165.

An aspect of a DPF renewing control in the other example is basically the same as the case of the fork lift car 220 which is described previously. This case is different from the case of the fork lift car 220 which is described previously, in a point that the lever switch groups 167 to 170 (the swing operating lever 167, the arm operating lever 168, the bucket operating switch 169 and the boom operating lever 170) are employed as the operating means with respect to the working portion 150 in steps S05 and 813 of FIG. 12, and a step S23 of FIG. 13, and that it is determined whether at least one of the lever switch groups 167 to 170 is under operation. As mentioned above, though the operating means 167 to 170 to be determined are different, the structure in which the renewing devices 70, 81, 82 and 117 are not actuated regardless of the clogged state of the exhaust gas purification device 50 under operation of the operating means 167 to 170 with respect to the working portion 150 is absolutely the same as the case of the fork lift car 220 which is previously described. Even in the case that the control mentioned above is employed, it is possible to achieve the same operations and effects as the case of the fork lift car 220 which is described previously.

(7) Others

The present invention is not limited to the embodiments mentioned above, but can be embodies into various aspects. The structure of each of the portions is not limited to the illustrated embodiment, but can be variously changed within a range which does not deflect from the scope of the present invention.

REFERENCE SIGNS LIST

11 ECU
23 exhaust gas temperature warning lamp
24 renewal lamp (forced renewal advance notifying means)
26 DPF temperature sensor
28 renewal inhibition lamp (renewal inhibition informing means)
45 mode selection switch (mode selection input means)
50 DPF (exhaust gas purification device)
70 engine
81 intake air throttle device
82 exhaust gas throttle device
117 common rail system
120 common rail

The invention claimed is:

1. An exhaust gas purification system comprising:
a common rail engine mounted to a working machine;
an exhaust gas purification device coupled to an exhaust system of the common rail engine;
at least one throttle device comprising an intake air throttle device and an exhaust gas throttle device coupled to intake and exhaust systems of the common rail engine; and
an ECU configured to operate the common rail engine in:
an auxiliary renewing mode in which a temperature of exhaust gas is raised based on actuation of the at least one throttle device,
a forced renewing mode in which a fuel is supplied to the common rail engine using an injection timing based on a post injection time; and
a mode selection input means which, in a case that a clogged state of the exhaust gas purification device is equal to or greater than a first prescribed level, is configured to indicate a mode selection between the auxiliary renewing mode or the forced renewing mode;
wherein:
in a case that an accumulated drive time of the common rail engine exceeds a set time, the forced renewing mode is executed regardless of the clogged state of the exhaust gas purification device; and
in a case that the accumulated drive time of the common rail engine is less than the set time and the clogged state of the exhaust gas purification device is greater than or equal to the first prescribed level, either the auxiliary renewing mode or the forced renewing mode is executed based on the indicated mode selection of the mode selection input means; and
when the clogged state of the exhaust gas purification device is not improved after execution of the auxiliary renewing mode, the forced renewing mode is executed regardless of the indicated mode selection of the mode selection input means.

2. The exhaust gas purification system according to claim 1, wherein a notification is provided before the forced renewing mode is executed.

3. The exhaust gas purification system according to claim 2, further comprising:
a lamp coupled to the ECU and configured to receive an output of the ECU; and
wherein before the forced renewing mode is executed, the lamp is configured to blink at a first frequency.

4. The exhaust gas purification system according to claim 1, wherein the ECU is further configured to:
after execution of the auxiliary renewing mode, compare a second particulate matter level of the exhaust gas purification device to a second prescribed level different from the first prescribed level; and
based on the second particulate matter level being greater than or equal to the second prescribed level:
initiate execution of the forced renewing mode regardless of the indicated mode selection; and generate an output to indicate execution of the forced renewing mode; and the second prescribed level is less than the first prescribed level.

5. The exhaust gas purification system according to claim 4, further comprising:

a timer coupled to the ECU and configured to calculate a drive time of the common rail engine; and wherein, when the drive time of the common rail engine is greater than or equal to a predetermined drive time, the ECU is further configured to initiate execution of the forced renewing mode regardless of a mode selection state.

6. The exhaust gas purification system according to claim 1, wherein the exhaust gas purification system is structured such that the auxiliary renewing mode is executed regardless of the clogged state of the exhaust gas purification device, in the case that the temperature of the exhaust gas within the exhaust gas purification device is equal to or less than a previously set prescribed temperature.

7. The exhaust gas purification system according to claim 6, wherein the exhaust gas purification system is structured so as to come back to a normal operation mode after a predetermined time elapses, in the case that the auxiliary renewing mode is executed based on the temperature of the exhaust gas within the exhaust gas purification device.

8. The exhaust gas purification system according to claim 7, wherein, an executing time of the auxiliary renewing mode based on the temperature of the exhaust gas within the exhaust gas purification device is set shorter than an executing time of the auxiliary renewing mode based on the basis of the clogged state of the exhaust gas purification device.

9. An exhaust gas purification system comprising:

a common rail engine coupled to a work machine;

an exhaust gas purification device coupled to the common rail engine and configured to receive an exhaust gas; and a throttle device comprising an intake air throttle or an exhaust gas throttle; and an ECU configured to operate the common rail engine in:
 a normal mode;
 an auxiliary renewing mode in which a temperature of the exhaust gas is raised based on actuation of the throttle device; and
 a forced renewing mode in which a fuel is supplied to the common rail engine using an injection timing based on a post injection time;

wherein the ECU is further configured to:
 determine whether a work portion of the work machine is in an operation state or a non-operation state;
 based on a determination that the work portion is in the non-operation state, select an operation mode of the common rail engine as one of the auxiliary renewing mode or the forced renewing mode based on a particulate matter level of the exhaust gas purification device being greater than or equal to a first prescribed level;
 based on a determination that the work portion is in the operation state:
  prohibit operation of the auxiliary renewing mode regardless of whether the particulate matter level of the exhaust gas purification device is greater than or equal to the first prescribed level;
  generate an output to indicate the auxiliary renewing mode is not executed based on the work portion being in the operation state;
  start a timer; and
  enable an operation of the auxiliary renewing mode after a value of the timer is greater than or equal to a predetermined time.

10. The exhaust gas purification system according to claim 9, further comprising:

a differential pressure sensor coupled to the ECU, the differential pressure sensor configured to measure the particulate matter level; and wherein, when the output is generated, the ECU is configured to activate a renewal inhibition lamp.

11. The exhaust gas purification system according to claim 9, further comprising:

the timer coupled to the ECU; and wherein, after the auxiliary renewing mode is not executed based on the work portion being in the operation state, the ECU is configured to:
 initiate execution of the auxiliary renewing mode after the value of the timer is greater than or equal to the predetermined time.

12. An exhaust gas purification system comprising:

a common rail engine coupled to a work machine;

an exhaust gas purification device coupled to the common rail engine and configured to receive an exhaust gas;

a throttle device comprising an intake air throttle or an exhaust gas throttle; and an ECU configured to operate the common rail engine in:
 a normal mode;
 an auxiliary renewing mode in which a temperature of the exhaust gas is raised based on actuation of the throttle device, and
 a forced renewing mode in which a fuel is supplied to the common rail engine using an injection timing based on a post injection time;

wherein the ECU is further configured to:
 in response to a first particulate matter level of the exhaust gas purification device being greater than or equal to a first prescribed level, identify a selected mode between the auxiliary renewing mode or the forced renewing mode; and
 based on a temperature of the exhaust gas being less than or equal to a prescribed temperature for an entirety of predetermined period of time, execute the auxiliary renewing mode regardless of the selected mode.

13. The exhaust gas purification system according to claim 12, wherein the ECU is further configured to:

when the selected mode is the auxiliary renewing mode:
 after execution of the auxiliary renewing mode, compare a second particulate matter level of the exhaust gas purification device to a second prescribed level different from the first prescribed level; and
 based on the second particulate matter level being greater than the second prescribed level:
  initiate execution of the forced renewing mode regardless of the selected mode; and
  generate an output to indicate execution of the forced renewing mode.

14. The exhaust gas purification system according to claim 12, further comprising:

a mode selection switch configured to receive a selection from an operator of the work machine; and wherein the ECU is configured to identify the selected mode based on a state of the mode selection switch.

15. The exhaust gas purification system according to claim 12, wherein the prescribed temperature is associated with a renewal boundary temperature.

16. The exhaust gas purification system according to claim 15, further comprising:
- a temperature sensor coupled to the exhaust gas purification device and configured to measure a temperature of exhaust gas; and
- a differential pressure sensor coupled to the ECU and configured to measure a particulate matter level of the exhaust gas purification device; and
- wherein, when the auxiliary renewing mode is executed based on the temperature being less than the prescribed temperature, the ECU is configured to execute the normal mode after a first execution time period elapses.

17. The exhaust gas purification system according to claim 16, wherein:
- when the auxiliary renewing mode is executed based on the temperature being less than the prescribed temperature, the auxiliary renewing mode is executed for the first execution time period; and
- when the auxiliary renewing mode is executed based on the particulate matter level being greater than or equal to a prescribed level, the auxiliary renewing mode is executed for a second execution time period that is greater than the first execution time period.

* * * * *